United States Patent [19]

Foote, Jr. et al.

[11] Patent Number: 5,119,549
[45] Date of Patent: Jun. 9, 1992

[54] APPARATUS AND METHOD FOR APPLYING END CAPS TO CYLINDRICAL SHELLS

[75] Inventors: James C. Foote, Jr., York; Lyndon R. Huttemann; Joseph A. Watkins, all of Rochester, N.Y.

[73] Assignee: Eastman Kodak Company, Rochester, N.Y.

[21] Appl. No.: 623,629

[22] Filed: Dec. 6, 1990

[51] Int. Cl.⁵ .................. B23P 19/02; B23P 19/04; B65B 7/28
[52] U.S. Cl. ..................... 29/806; 29/281.4; 29/773; 53/486; 53/488; 53/284; 53/310
[58] Field of Search ........... 29/731, 773, 806, 281.4; 53/284, 284.2, 308, 310, 343, 330, 349, 353, 284, 486, 488, 489

[56] References Cited

U.S. PATENT DOCUMENTS

| | | | |
|---|---|---|---|
| 904,879 | 11/1908 | Kirkegaard | 53/343 X |
| 1,310,118 | 7/1919 | Greenfield et al. | |
| 1,748,960 | 3/1930 | Risser | 53/343 X |
| 2,030,188 | 2/1936 | Smith | 53/343 X |
| 2,940,232 | 6/1960 | Wallace et al. | 53/112 |
| 3,466,845 | 9/1969 | Beekes et al. | 53/194 |
| 3,668,824 | 6/1972 | Solomonov et al. | 53/330 |
| 3,724,162 | 4/1973 | Lorenzini et al. | 53/330 X |
| 3,961,463 | 6/1976 | Dimond | 53/306 |
| 4,080,711 | 3/1978 | Kawada et al. | 29/427 |
| 4,115,913 | 9/1978 | Moriya et al. | 29/806 X |
| 4,537,012 | 8/1985 | Groom et al. | 53/552 |
| 4,614,019 | 9/1986 | Shimizu et al. | 29/450 |
| 4,656,737 | 4/1987 | Shimizu et al. | 29/806 |
| 4,848,060 | 7/1989 | Kubis et al. | 53/308 |
| 4,924,419 | 5/1990 | McIntyre et al. | 29/806 X |
| 4,974,316 | 12/1990 | Suzuki et al. | 29/806 |

Primary Examiner—Horace M. Culver
Attorney, Agent, or Firm—Charles E. Snee, III

[57] ABSTRACT

A pair or relatively movable jaws (306) are provided with magnetic holders (306–316) for holding end caps (24) to be applied to a substantially cylindrical shell (28) positioned between the jaws; so that, closing of the jaws installs the end caps on the end edges of the shell. An end cap placing mechanism (50) removes end caps from a source (356) by means of a pair of rotatably mounted gripper arms (364) which place the caps in the magnetic holders.

6 Claims, 27 Drawing Sheets

FIG. II

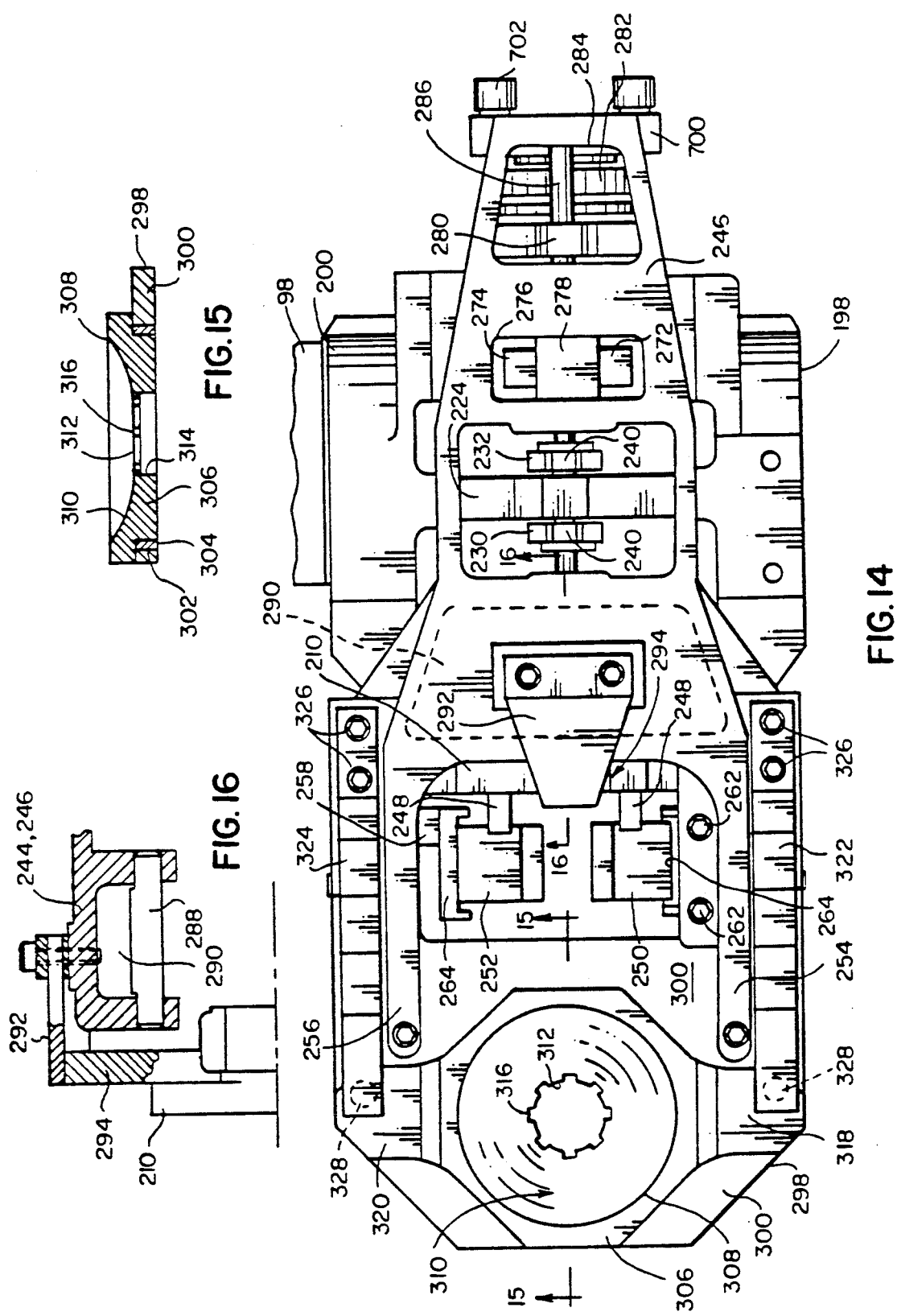

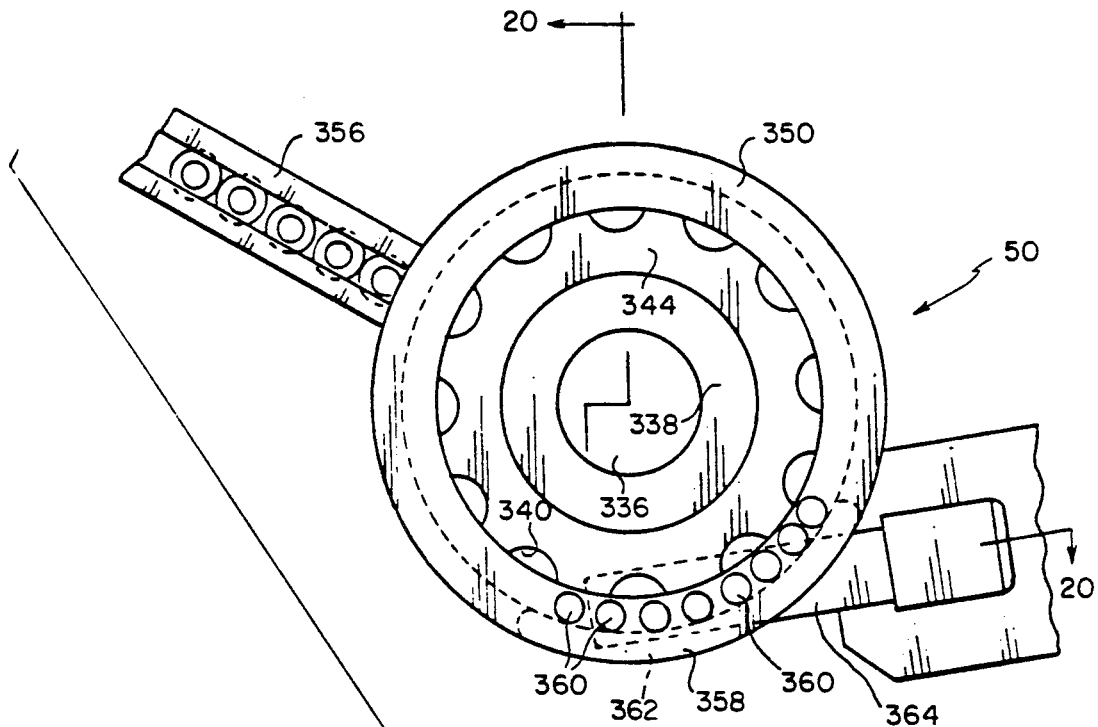
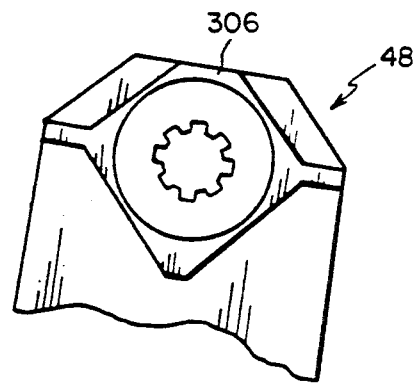
FIG. 19

APPARATUS AND METHOD FOR APPLYING END CAPS TO CYLINDRICAL SHELLS

CROSS REFERENCE TO RELATED APPLICATIONS

This application is related to the following concurrently filed applications of: (1) James C. Foote, Jr., Robert F. Allen, Paul E. Bailey, Dean B. Campbell, Thomas A. Cipolla, William G. Hoyt, Robert L. Huseby, Lyndon R. Huttemann, David H. Lancy, William C. Lebbon, Stephen M. Reinke, Thomas E. Stark and Joseph A. Watkins for Apparatus and Method for Forming and Loading a Magazine for Prewound Spools of Web Material; and (2) Stephen M. Reinke, James C. Foote, Jr., Thomas A. Cipolla, William G. Hoyt, Lyndon R. Huttemann and Joseph A. Watkins for Apparatus and Method for Removing a Very Open Shell from a Forming Mandrel.

DESCRIPTION

Technical Field

The present invention relates to apparatus and methods for applying end caps to cylindrical shells. More particularly, the invention concerns such apparatus and methods in which substantially cylindrical metal shells are fitted with disk like end caps having peripherally and axially extending flanges which telescopically receive the end edges of the shell.

Background Art

Numerous techniques have been developed over the years for installing a closure or the like on a shell or container. For example, U.S. Pat. No. 1,310,118 discloses an apparatus for applying metal rings to the lip of a container in which axial movement of a plunger initially seats the ring on the lip and then causes a plurality of arms to move radially outwardly to press the ring against the container. U.S. Pat. No. 2,940,232 discloses an apparatus for use with photographic film in which strips of film are wound on spools, after which the wound spools are inserted axially into previously formed cylindrical magazine shells to which one end cap has already been applied, the shells having axially extending lips through which the leader of the film strip extends in the familiar manner. The cap for the open end of the shell is later applied. U.S. Pat. No. 3,668,824 shows a device for securing a valve in the neck of an aerosol container in which radially moving arms press the valve into engagement with the sides of the lip of the container. Commonly assigned U.S. Pat. No. 3,724,162 discloses a mechanism for applying end caps to magazines used for photographic film, in which the caps are picked up by a plurality of radially movable shoes which carry the cap into position on the end edges of the cylindrical magazine shell and then are moved outwardly to stake the cap in place. U.S. Pat. No. 3,961,463 discloses a self releasing capper chuck in which radially movable jaws grip a closure on an inside diameter, move the closure into engagement with a container and then retract to leave the closure in place on the container.

While cap applying apparatus and methods of the types shown in these patents have received a certain commercial acceptance, a need has existed for an apparatus which could accurately apply end caps to both ends of a cylindrical shell and then hold the caps in place while the apparatus moves the assembly of shell and caps to a separate location for staking.

SUMMARY OF THE INVENTION

An objective of the invention is to provide an improved apparatus and method for applying end caps to a cylindrical shell in which a very open shell is received, transferred to a location for lateral installation of a prewound spool, closed about the spool to form a cylindrical shell and provided with end caps.

Another objective of the invention is to provide such an improved apparatus and method which can orient such a very open shell for installation of a prewound spool.

Still another objective of this invention is to provide such an apparatus and method which can position such a very open shell for closing about a prewound spool.

Yet another objective of this invention is to provide such an apparatus and method which can provide repeatable, controlled end cap to end cap dimensions for the completed magazine.

These objectives are given only by way of illustrative examples; thus, other desirable objectives and advantages inherently achieved by the disclosed apparatus and method of the invention may occur or become apparent to those skilled in the art. Nonetheless, the scope of the invention is to be limited only by the appended claims.

The means for applying end caps preferably comprises at least one pair of relatively movable jaws mounted on an assembly dial, the jaws being positioned one opposite each end of a very open shell which is held within the jaws of a shell removal mechanism. In the illustrated embodiment, eight pairs of such jaws are arranged around the assembly dial for receiving very open shells in sequence from a first dial where the shells are formed from blanks. Means are located on each jaw for holding one end cap, such as recess in an anvil made of magnetic material. Adjacent the assembly dial is provided a mechanism for placing end caps in each of the means for holding. A means for closing the jaws to apply the end caps is provided. Preferably, the movable jaws are constrained to parallel movement toward and away from each other to ensure that the end caps are properly installed. A rotatable crank shaft is provided between the jaws and is connected to the jaws by oppositely movable connecting rods; so that, rotation of the crank shaft causes the jaws to open and close.

End caps are placed within the jaws of the means for applying them by a mechanism which comprises a pair of cap delivery wheels rotatably mounted next to the assembly dial, each delivery wheel comprising a plurality of circumferentially spaced pockets for receiving end caps, means for feeding end caps into the pockets, and a frame mounted for rotation adjacent to the second dial. A pair of cap transfer arms are pivotably mounted to the frame, each arm having an outer end selectively positionable upon rotation of the frame into proximity either with one of the peripheral pockets or with one of the means for holding end caps in the means for applying end caps. Means are provided for selectively pivoting the cap transfer arms relative to the frame, toward or away from the peripheral pockets or toward or away from the means for holding.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 14 shows a top view of the mechanism of FIG. 11.

FIG. 15 shows a sectional view taken along line 15—15 of FIG. 14.

FIG. 16 shows a sectional view taken along lines 16—16 of FIG. 14.

FIG. 19 shows a fragmentary front elevation view of the mechanism for supplying end caps to the mechanism of FIG. 11.

FIG. 26 shows a plan view of the cam plate used in the mechanism of FIG. 22.

DESCRIPTION OF THE PREFERRED EMBODIMENTS

Figure 1:
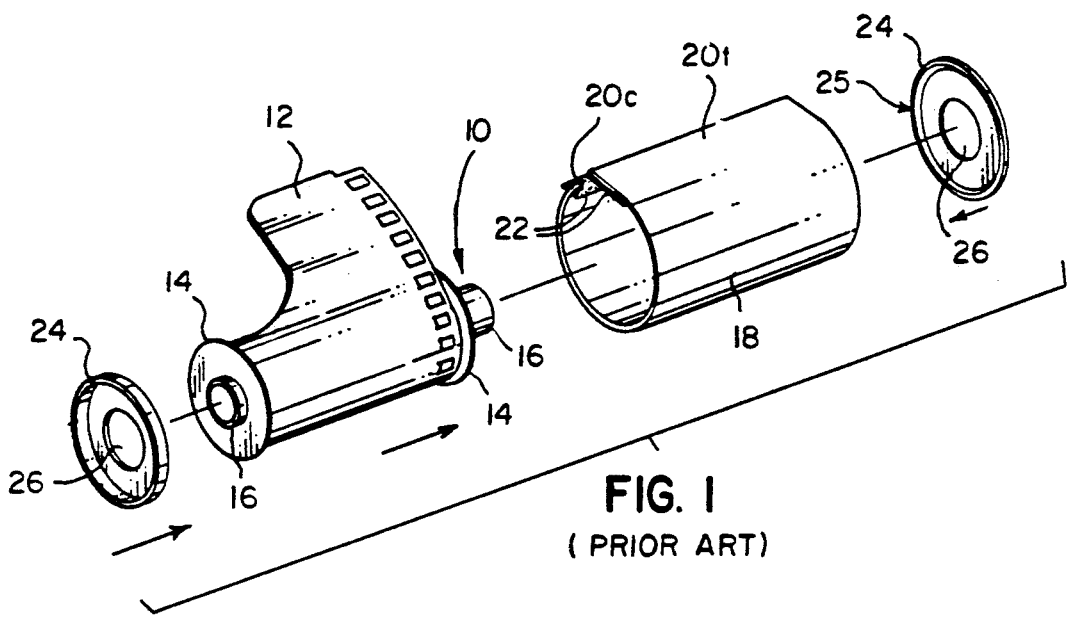
FIG. 1 shows an exploded perspective view of a known type of magazine for photographic film, illustrating one prior art technique for inserting a prewound spool axially into the shell of the magazine and applying the end caps.

The following is a detailed description of the preferred embodiments of the invention, reference being made to the drawings in which the same reference numerals identify the same elements of structure in each of the several Figures.

FIG. 1 illustrates a known process for loading photographic film magazines. A spool 10 has been used which comprises a central core, not illustrated, on which is wound a strip 12 of photographic film. Spool 10 includes a pair of end flanges 14 from which extend hollow axial hubs 16. A preformed metal shell 18 has been used which comprises a pair of axially extending lips 20c, 20t between which strip 12 is withdrawn from or wound back into the magazine in use by the consumer. These axially extending lips typically are different in geometry, lip 20c being folded or crimped back on itself and lip 20t being essentially tangent to the cylindrical preformed shell 18. Typically, preformed shell 18 has been formed from a substantially flat rectangular blank, not illustrated, in which lips 20c, 20t have previously been formed. To prevent leakage of light into the magazine, lips 20c and 20t have for many years been covered with a lightlock material 22 such as black velvet or plush which firmly but gently engages the surfaces of the film and prevents light leakage into the magazine. The ends of the magazine are closed by a pair of annular end caps 24, each having an aperture 26 for rotatably receiving hubs 16 and a circumferentially extending groove and flange for fixedly engaging the end edges of preformed shell 18. Such magazines have been assembled by inserting the prewound spool of film axially into preformed shell 18 and then applying and staking end caps 24. While this spooling and assembling process is reliable and has been rather widely used, the apparatus for practicing the process tends to be limited in speed.

Figure 2:
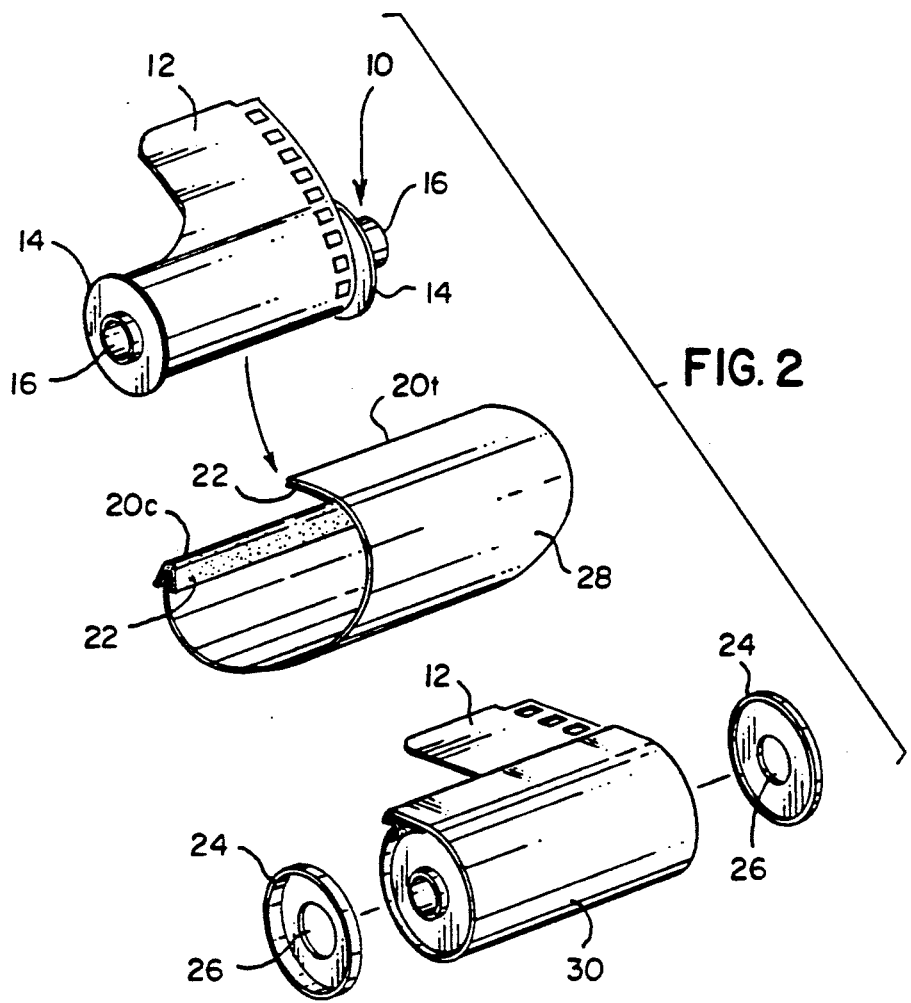
FIG. 2 shows an exploded perspective view of a known type of magazine for photographic film, illustrating a method for inserting a prewound spool radially, laterally into the shell of the magazine and applying the end caps.

FIG. 2 illustrates how a magazine can be assembled using, in part, the method and apparatus of the present invention. In this instance, instead of the essentially cylindrical preformed shell 18 used in the past to permit axial insertion of the prewound spool, a very open preformed metal shell 28 is provided. Very open shell 28 is configured such that axially extending lips 20c, 20t are spaced far enough apart to permit the prewound spool to be inserted laterally or radially into shell 28. Then, very open shell 28 is closed about the prewound spool to a substantially cylindrical configuration 30 with the lead end of strip 12 captured between lips 20c, 20t. Then end caps 26 are applied and staked to complete the magazine. In the remainder of this specification, the process and apparatus will be described for forming the very open shell 28, inserting a prewound spool therein, closing the shell and applying the end caps.

OVERALL OPERATION

Figure 3:
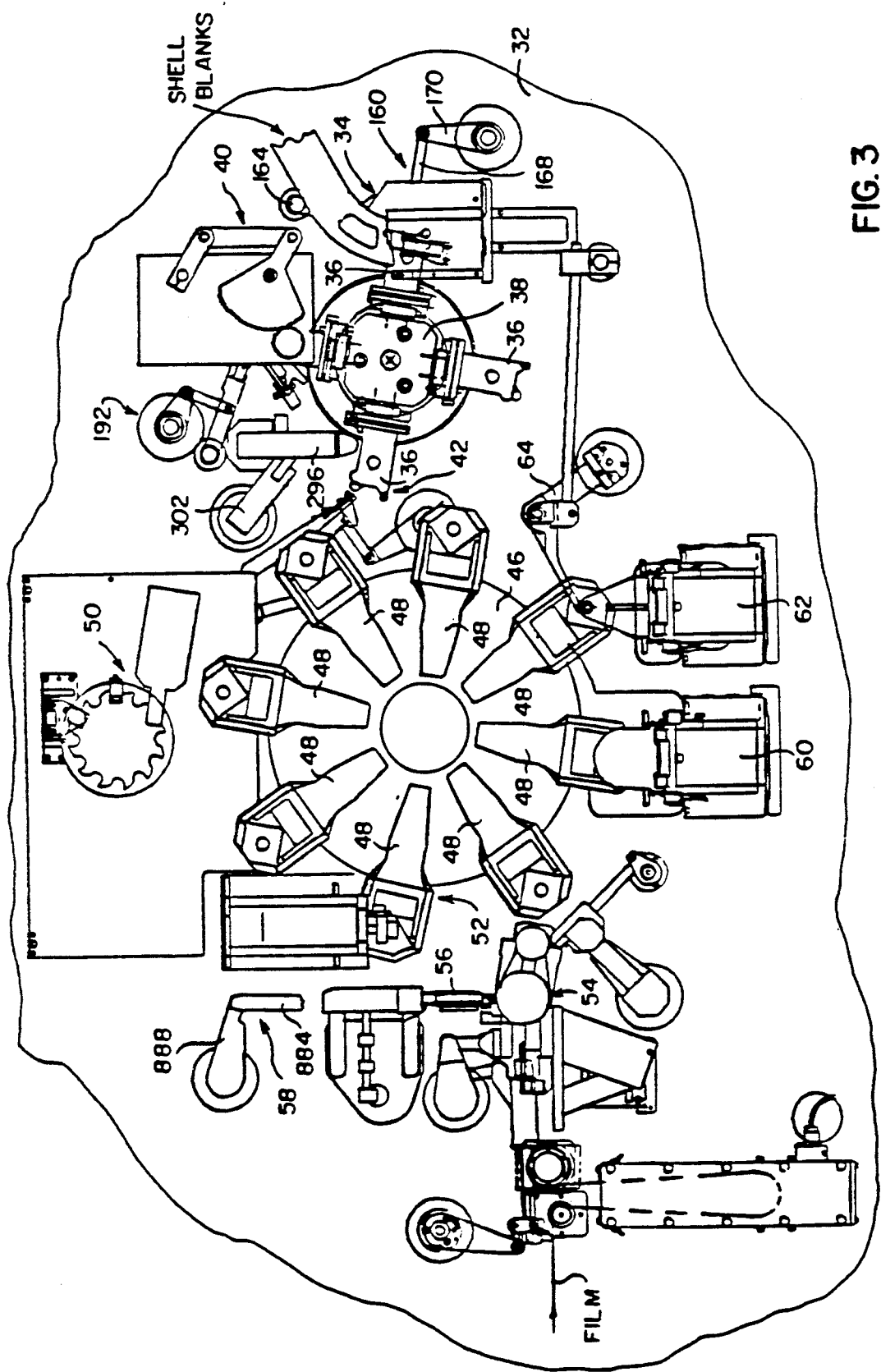
FIG. 3 shows a simplified schematic front elevation view of a synchronous film spooling and packaging apparatus embodying the apparatus according to the invention.

FIG. 3 illustrates the overall layout of a film spooling and packaging apparatus embodying the apparatus according to the invention. A rigid, vertically standing face plate 32 is preferred to provide a mount for the components of the invention; however, face plate 32 may be oriented differently or replaced with a structural framework without departing from the scope of the invention. A shell blank feeding mechanism 34 receives substantially flat, rectangular metal blanks to be formed into the cylindrical side wall of the completed magazine, each blank having been previously provided with lips 20c, 20t and lightlock strips 22. The shell blanks are fed one at a time to sequentially presented forming mandrels mounted on mandrel carriers 36 which in turn are mounted on a first forming dial 38 which rotates intermittently to index mandrel carriers 36 from position to position. As forming dial 38 is indexed, each mandrel carrier 36, having received a shell blank from feeding mechanism 34, is presented to a forming station 40 where very open shell 28 is formed about the mandrel. As forming dial 38 is indexed again, each mandrel carrier, with very open shell 28 formed about its mandrel, is presented to a shell removal station 42 where very open shell 28 is removed from the mandrel by a shell removal mechanism 44, FIGS. 28 to 31, mounted on an adjacent assembly dial 46.

As assembly dial 46 is indexed away from removal station 42, removal mechanism 44 is rotated by a cam and follower to position very open form shell 28 between the movable jaws of one of a plurality of end cap applying mechanisms 48 according to the present invention, which are also mounted on dial 46. Then when dial 46 has stopped, an end cap placing mechanism 50 according to the present invention transfers a pair of end caps to magnetic holders on the anvils of end cap applying mechanism 48 between which very open shell 28 has been positioned. Assembly dial 46 continues to index until a magazine assembly station 52 is reached, where a prewound spool will be inserted.

Figure 27:
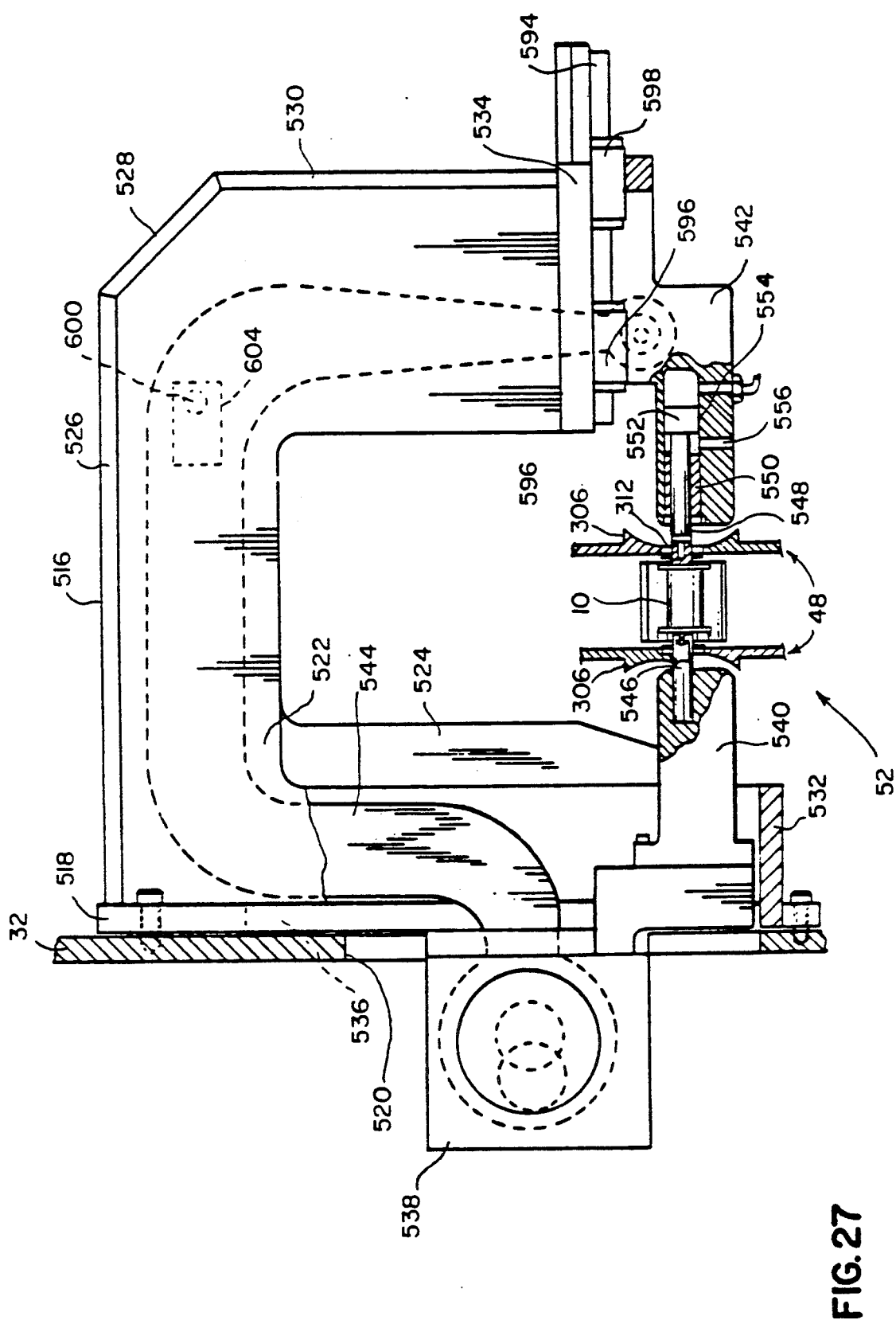
FIG. 27 shows a side elevation view, partially fragmentary and partially in section, of the station of the apparatus of FIG. 3 at which prewound spools are inserted radially, laterally into the very open shells, after which skewers are inserted, the very open shell is closed and the end caps are installed.

While the overall operations described in the preceding paragraphs are taking place, empty spools are provided to a spool winding station 54, which is described in copending, commonly assigned application Ser. No. 595,130. Once a spool has been wound, it is picked up and swung up into the waiting very open shell 28 at assembly station 52, by a wound spool transfer mechanism 56. To hold the spool steady during subsequent operations, a pair of skewers, not visible in FIG. 3 but shown in FIG. 27, are then inserted through openings in the jaws of end cap applying mechanism 48 and apertures 26 of end caps 24, into the hollow hubs 16 on the spool. A shell closing mechanism 58, shown only fragmentarily in FIG. 3 but in detail in FIGS. 32 to 36, is then extended to surround very open shell 28 and close it about the prewound spool. Wound spool transfer mechanism 56 is then withdrawn and end cap applying mechanism 48 is actuated to close its jaws and apply end caps 24 to the now cylindrical end edges of the shell. Shell closing mechanism 58 and the pair of skewers are then withdrawn to permit assembly dial 46 to index to end cap staking station 60 where end caps 24 are staked into firm engagement with the cylindrical walls of the completed magazine. Assembly dial 46 then indexes to a magazine removal station 62 where the jaws of end cap applying mechanism 48 are opened and the completed magazine is removed by a magazine removal mechanism 64.

ASSEMBLY DIAL 46

Figure 4:
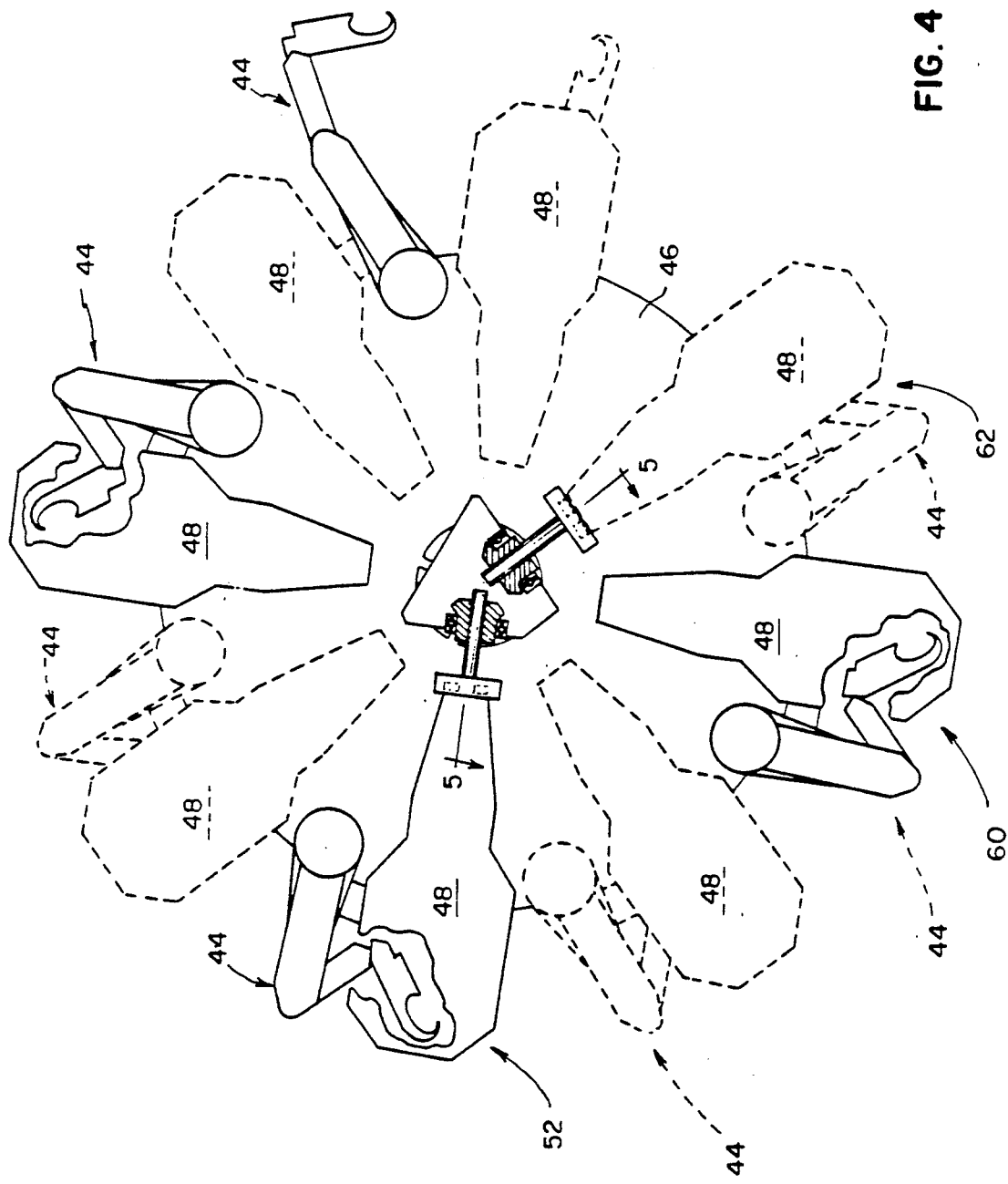
FIG. 4 shows a schematic, partially fragmentary front elevation view of the mechanisms which remove a very open shell from the mandrel and deliver it to an assembly station where a prewound spool is inserted into the shell.
Figure 5:
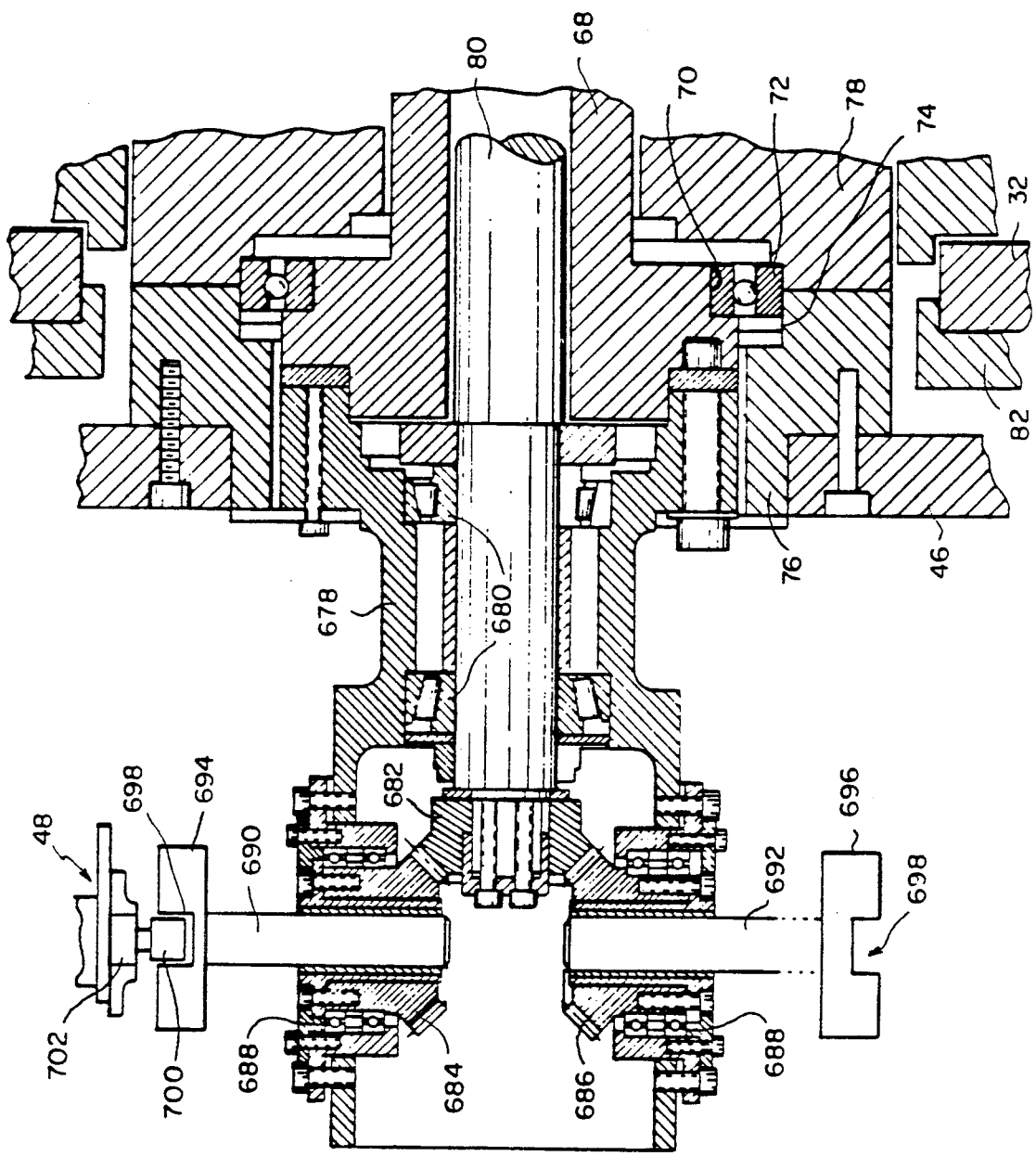
FIG. 5 shows an enlarged sectional view taken along line 5—5 of FIG. 4.

Shell removal mechanism 44 is supported by adjacent assembly dial 46, illustrated schematically in FIG. 4, which comprises an annular plate mounted for rotation relative to face plate 32 by a conventional indexer, not illustrated. Around the periphery of assembly dial 46 is arranged a plurality of end cap applying mechanisms 48 and on one side of each mechanism 48 is mounted a shell removal mechanism 44, some of which are shown in solid lines in FIG. 4, some in phantom lines. The manner of mounting assembly dial 46 to face plate 32 is illustrated in FIG. 5. An opening is provided through face plate 32, through which a central, stationary support tube 68 extends from a stationary support, not illustrated, at the back side of face plate 32. At its outer end, support tube 68 comprises a bearing mounting surface 70 for the inner race of a bearing 72. The outer race of bearing 72 is supported within a central counter bore 74 provided in an annular dial support plate 76 on the outer side of which assembly dial 46 is rigidly attached by bolts, for example. At its inner side, support plate 76 is rigidly attached to an annular adapter plate 78 having a central bore through which support tube 68 extends. Adapter plate 78 also supports the outer race of bearing 72. Adapter plate 78 is operatively attached to a conventional indexer, not illustrated, for rotating dial 46. An actuator shaft 80 extends through support tube 68 to a mechanism for actuating and deactuating end cap applying mechanisms 48, as will be discussed subsequently.

Figure 6:
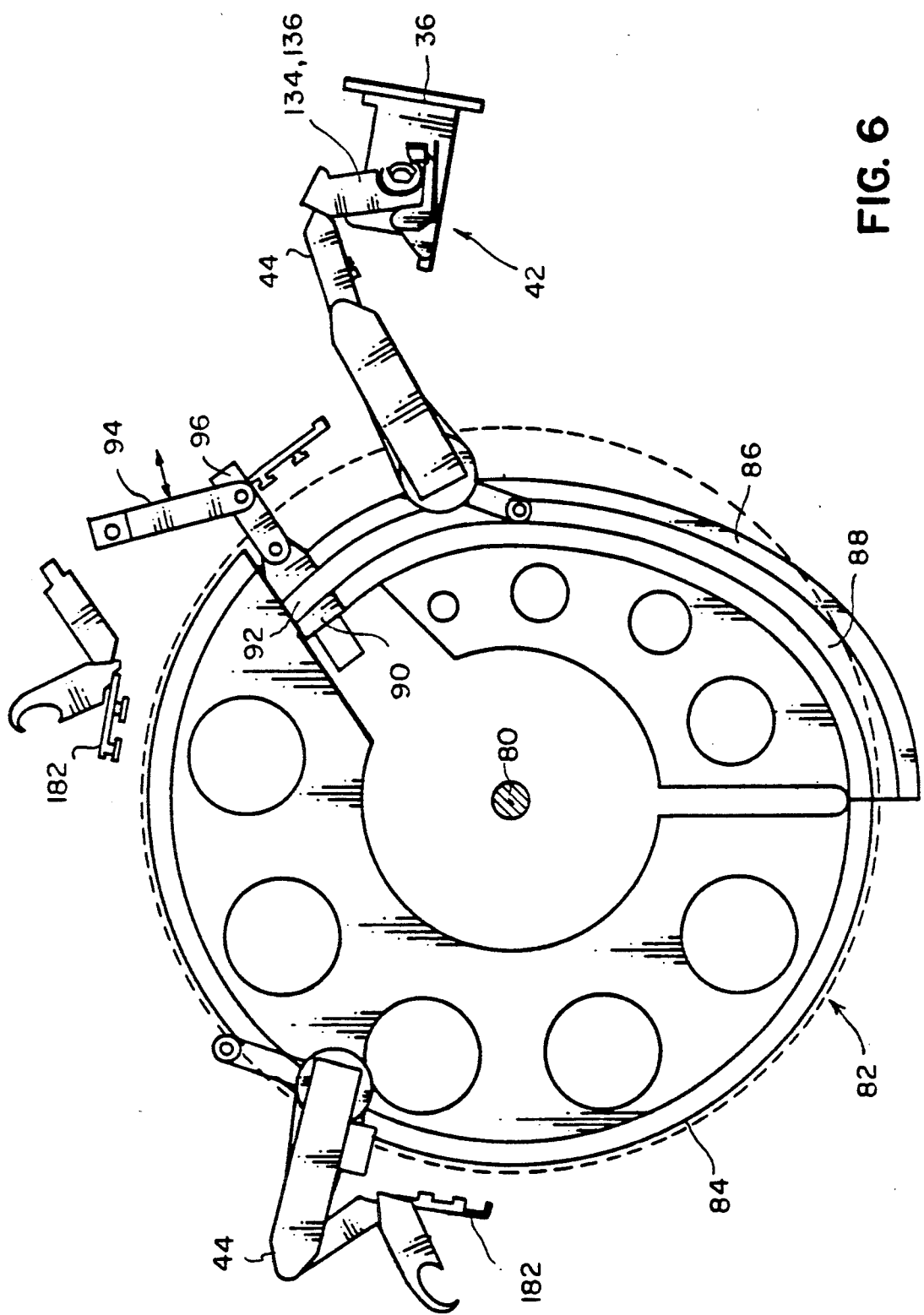
FIG. 6 shows the stationary cam plate which actuates the means for removing a very open shell.

As shown in FIGS. 5 and 6, behind assembly dial 46 and rigidly attached to face plate 32 is an essentially annular cam plate 82 which cooperates with a cam follower on shell removal mechanism 44 to swing very open shell 28 away from shell removal station 42 and place the shell in position for cooperation with one of end cap applying mechanisms 48. As seen in FIG. 6, cam plate 82 comprises a dwell segment 84 extending over approximately five eighths of the circumference of the plate and a decreasing radius segment 86 extending over the remainder of the circumference. As assembly dial 46 is rotated, the cam follower of each shell removal mechanism 44 rolls from the outside edge of dwell segment 84 into a slot 88 in decreasing radius segment 86, just as the associated end cap applying mechanism 48 is rotated away from magazine removal station 62. Subsequently, each cam follower is shifted from segment 86 back to segment 84, one indexing step after the associated end cap applying mechanism 48 is rotated away from shell removal station 42. This shifting of each cam follower is accomplished by means of a radially movable switch plate 90 having a slot segment 92 which can be positioned to receive a cam follower from slot 88 or to deliver the cam follower to the outside edge of dwell segment 84. Switch plate 90 may be moved when necessary by a crank arm 94 pivotably mounted at one end to face plate 32 and pivotably connected at its other end to a link 96 which in turn is pivotably connected to the radially outer end of switch plate 90. Crank arm 94 may be driven by a conventional oscillator, not illustrated.

Shell removal mechanism 44 is illustrated in FIGS. 7 to 10. A mounting plate 98 is attached to one side of each end cap applying mechanism 48 as illustrated fragmentarily in FIG. 7 and supports a transfer arm housing 100 having a rearwardly projecting shaft housing 102. Mounted for rotation within housing 102 is a shaft 104 which extends rearwardly toward face plate 32 through a bore 106 in dial 46. At its rearmost end, shaft 104 fixedly supports a cam follower 108 comprising a clamp block 110 fixedly attached to the end of shaft 104, a pair of flexure elements 112 extending from block 110 essentially parallel to cam plate 82, a roller support block 114 attached to the opposite ends of flexure elements 112 and a roller 116 rotatably supported by block 114. As assembly dial 46 is rotated, roller 116 rolls along the periphery of dwell segment 84 of cam plate 82 or through slot 88 in decreasing radius segment 86. As roller 116 traverses dwell segment 84, shaft 104 remains stationary; however, as roller 116 moves through slot 88, shaft 104 is rotated to position shell removal mechanism 44 to acquire a very open shell 28 from the forming mandrel, as indicated schematically at the right side of FIG. 6, and then to transfer the shell into position for cooperation with the associated end cap applying mechanism 48.

Figure 7:
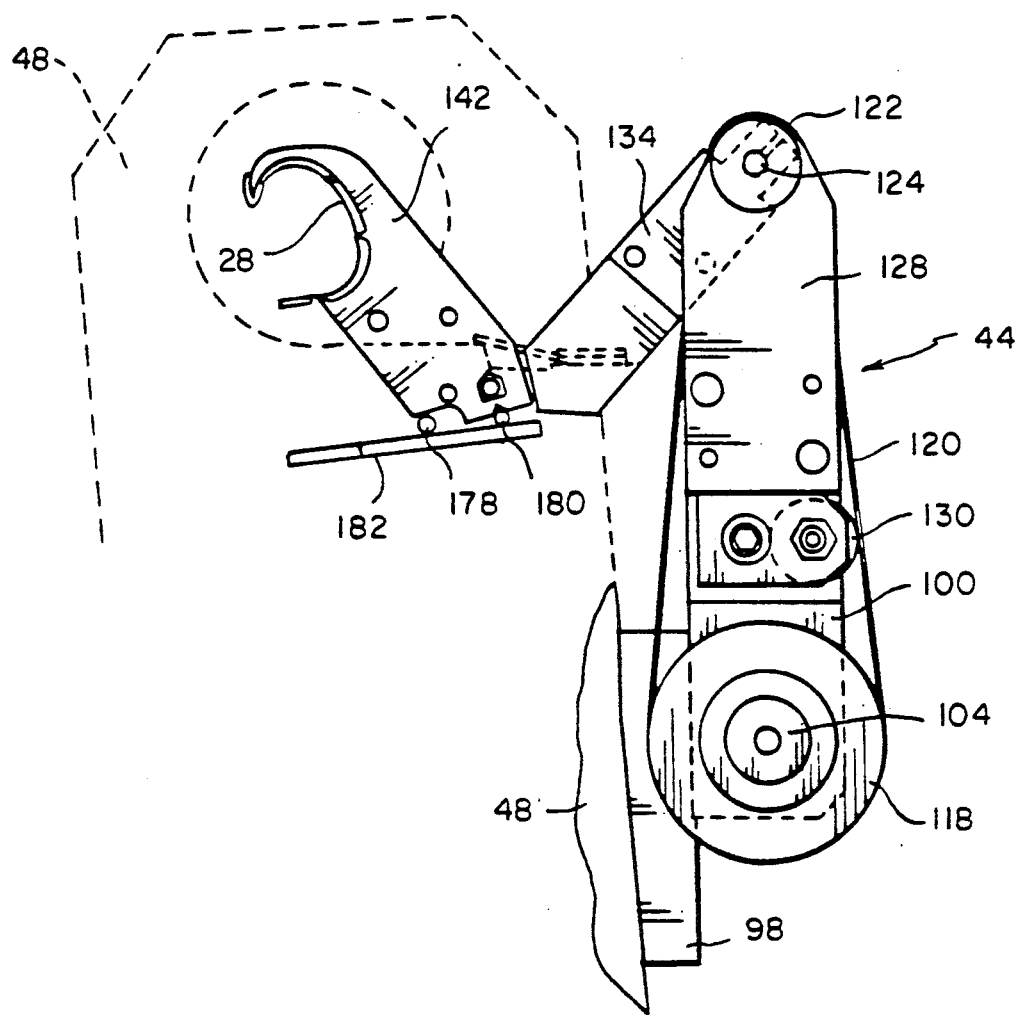
FIG. 7 shows a front elevation view of the means for removing a very open shell.
Figure 9:
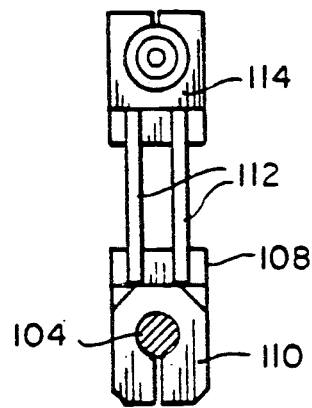
FIG. 9 shows a view of the cam follower arm of the mechanism of FIG. 8, taken along line 9—9 in FIG. 8.
Figure 8:
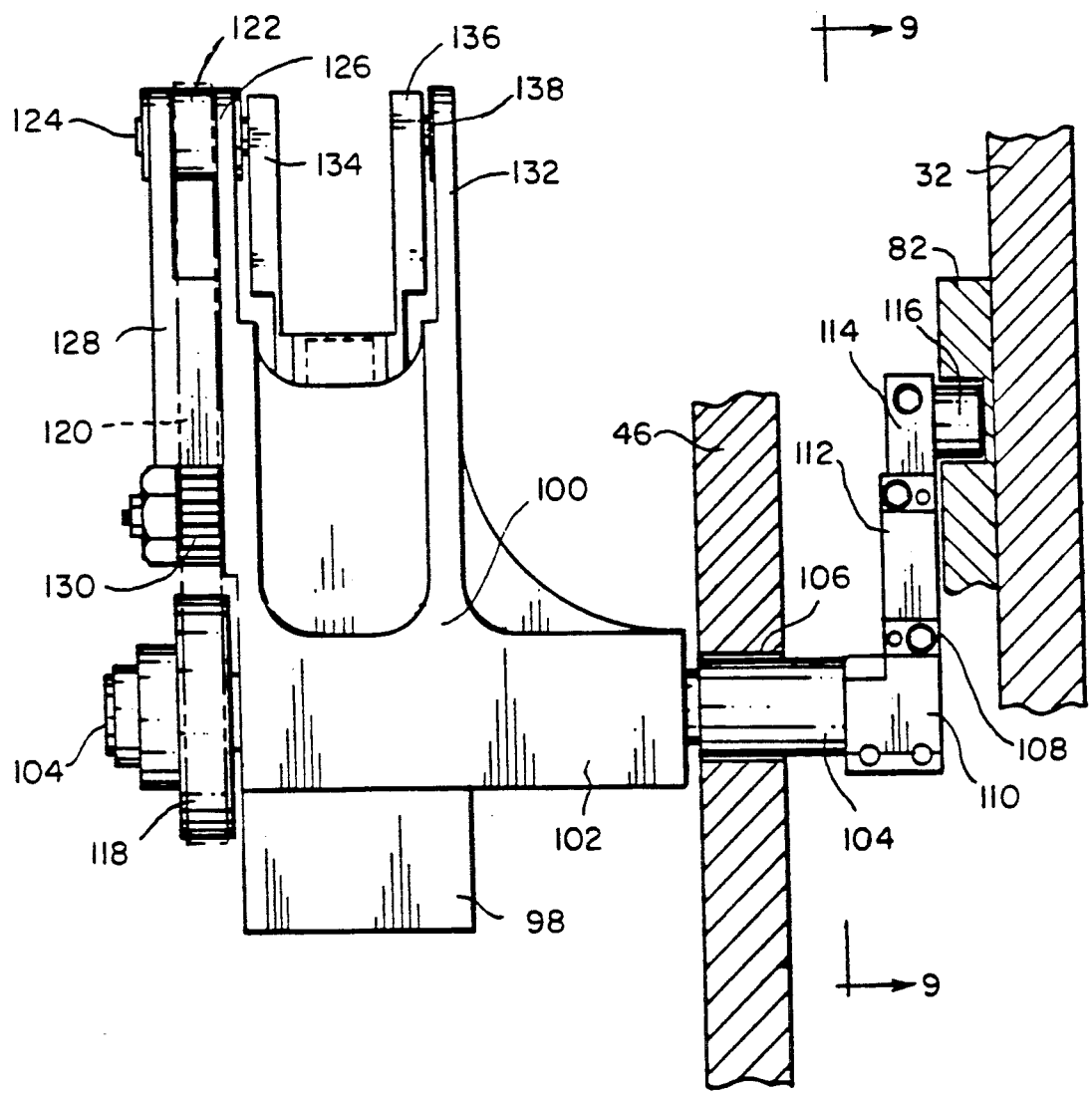
FIG. 8 shows a side elevation view of the mechanism of FIG. 7.
Figure 10:
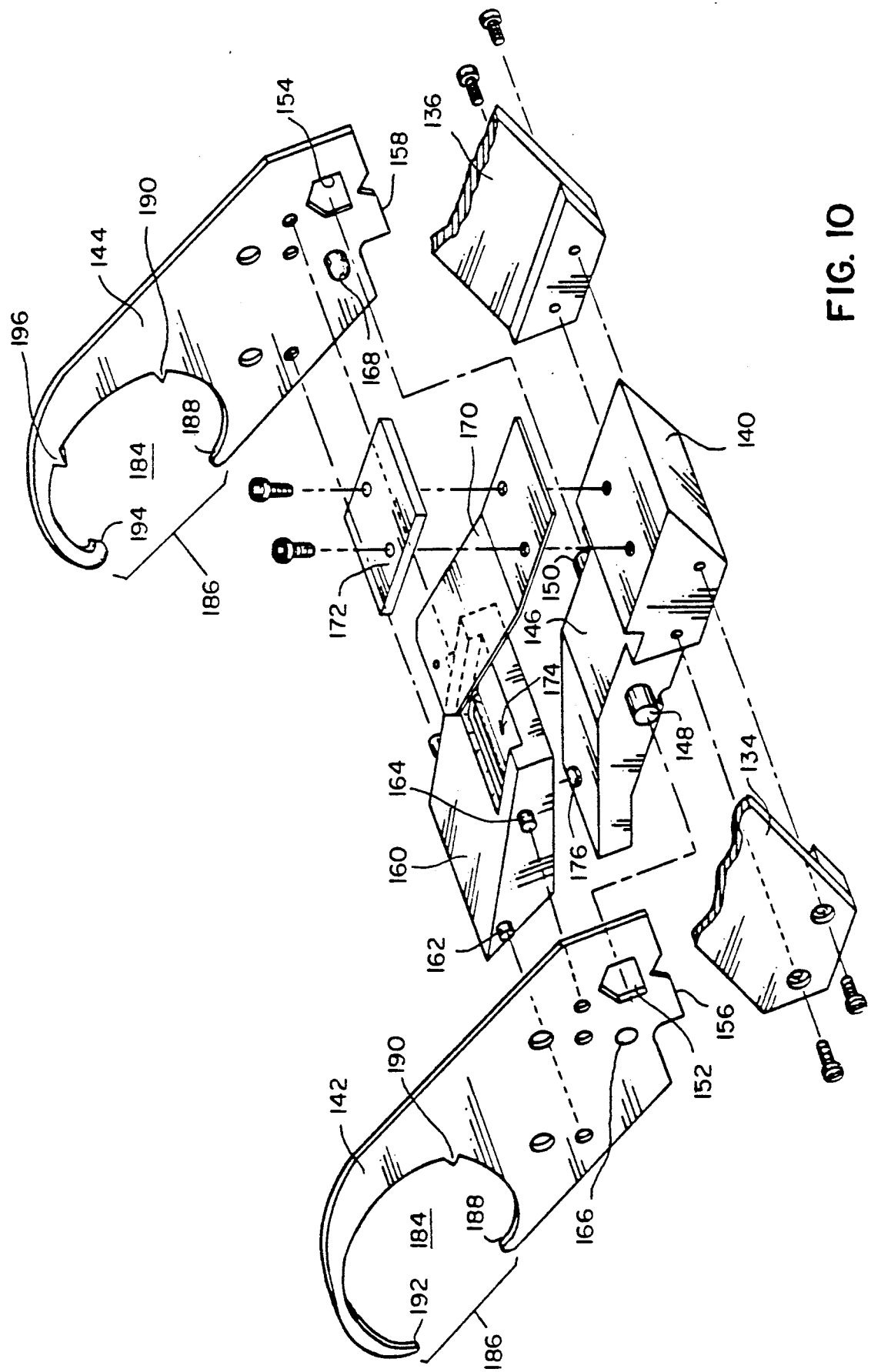
FIG. 10 shows an exploded perspective view of the nest mechanism which receives and holds the very open shells.

At the opposite end of shaft 104 is fixedly mounted a pulley 118 about which a timing belt 120 is wrapped. A pulley 122 is supported on a shaft 124 rotatably supported between an arm 126 extending from housing 100 essentially parallel to assembly dial 46 and a support plate 128 attached to arm 126. Timing belt 120 also is wrapped around pulley 122. The tension of timing belt 120 may be adjusted in the familiar manner using a tension roller 130 slidably mounted on the side of housing 100. To the rear of arm 126 is provided a second arm 132 extending from housing 100 essentially parallel to dial 46. A front support plate 134 is fixedly mounted for rotation with shaft 124. A rear support plate 136 is fixedly mounted on a shaft 138 rotatably mounted near the end of second arm 132 and coaxial with shaft 124. As seen in FIGS. 7, 8, and 10, support plates 134, 136 extend away from shafts 124, 138 and are attached at their outer ends to an elongated support base 140 for a pair of fixed claws 142, 144 of shell removal mechanism 44. Base 140 includes an outwardly protruding tongue portion 146 having a pair of laterally protruding stub axles 148, 150 in its side edges, axles 148, 150 being loosely received in pentagonal shaped apertures 152, 154 provided near reference edges 156, 158 of claws 142, 144. The vee-shaped sides of apertures 152, 154 normally support axles 148, 150, with clearances to the remaining sides of the apertures which serve as stops against excess movement. A tie plate 160 extends between claws 142, 144 and fixes the claws in parallel planes by means of through pins 162, 164 which mate with corresponding apertures in the claws. A pair of bearing buttons 166, 168 are attached to the inner sides of claws 142, 144 facing tongue portion 146 and are provided at their rounded tips with a small clearance to tongue portion 146. Tie plate 160 is biased toward tongue portion 146 by means of a leaf spring 170 attached by a hold down plate 172 to support base 140. The outer end of spring 170 extends into a pocket 174 in tie plate 160. The movement of tie plate 160 toward tongue portion 146 is limited by a bearing button 176 centrally located near the outer end of tongue portion 146.

Because of the loose fit between stub axles 148, 150 and apertures 152, 154, the assembly of tie plate 160 and claws 142, 144 is permitted limited universal movement relative to support base 140. In the direction transverse to support plates 134, 136, this movement is limited by bearing buttons 166, 168 and the sides of apertures 152, 154. In the direction about stub axles 148, 150, this movement is limited by bearing button 176 and the sides of apertures 152, 154 if the assembly is rotated toward tongue portion 146; whereas, if the assembly is rotated away from tongue portion 146, this movement is limited ultimately by contact between claws 142, 144 and support plates 134, 136. This range of movement is important to proper operation of the apparatus according to the invention. When shell removal mechanism 44 is swung into the position shown in FIG. 7, reference edges 156, 158 must engage properly with positioning bars 178, 180 on a reference datum plate 182 mounted between the jaws of end cap applying mechanism 48. The range of movement of the assembly of claws 142, 144 and tie plate 160 ensures that the assembly will be able to orient properly against the positioning bars to ensure that very open shell 28 is properly positioned to receive a prewound roll of film, to be closed about the film and to receive a pair of end caps.

Each claw 142,144 comprises a central opening 184 sized to permit axial passage of the forming mandrel, not illustrated, with a shell clamped in place. Opening 184 is also sized to permit the shell to spring into and be firmly held within the central opening due to the spring force of the shell. Since the spring force of the shell causes it to spring into a fixed configuration within opening 184, changes in the material properties of the shell can be accommodated without influencing the shape of the shell as held within opening 184. Each claw includes a throat 186 on one side of opening 184, the throat being sufficiently wide to permit lateral passage of a prewound roll of film into a very open shell 28 held between the two claws. Each claw includes on the side of throat 186 closer to support base 140 a tine 188 which engages the shell near lip 20t. Spaced along the circumference of opening 184 from tine 188, each claw includes a shell positioning protrusion 190 which prevents the shell from springing open farther than necessary. On the opposite side of throat 186 from tine 188, claw 142 includes a tine 192 which engages the roll formed shell in the crimp formed by lip 20c. In the case of claw 144, a different arrangement is preferred on the opposite side of throat 186. The forming mandrel for the very open shell, not illustrated, is moved outwardly from forming dial 38 to a position where the shell can be removed by mechanism 44. A pair of clamping fingers, not illustrated, press against the roll formed shell near lip 20t and move easily past tines 188 as the mandrel and the roll formed shell are moved outwardly. In contrast to this, a clamp member, not illustrated, which is engaged in the crimp formed by lip 20c, would prevent the mandrel and shell from passing a tine configured like tine 192 of claw 142, if such tine were used on claw 144. So, claw 144 is provided with a tine 194 spaced circumferentially away from the path of the clamp member. To ensure that the end of the shell held by claw 144 is positioned identically with that held by claw 142, an additional shell positioning protrusion 196 is provided on claw 144 between tine 194 and protrusion 190.

END CAP APPLYING MECHANISM 48

Figure 11:
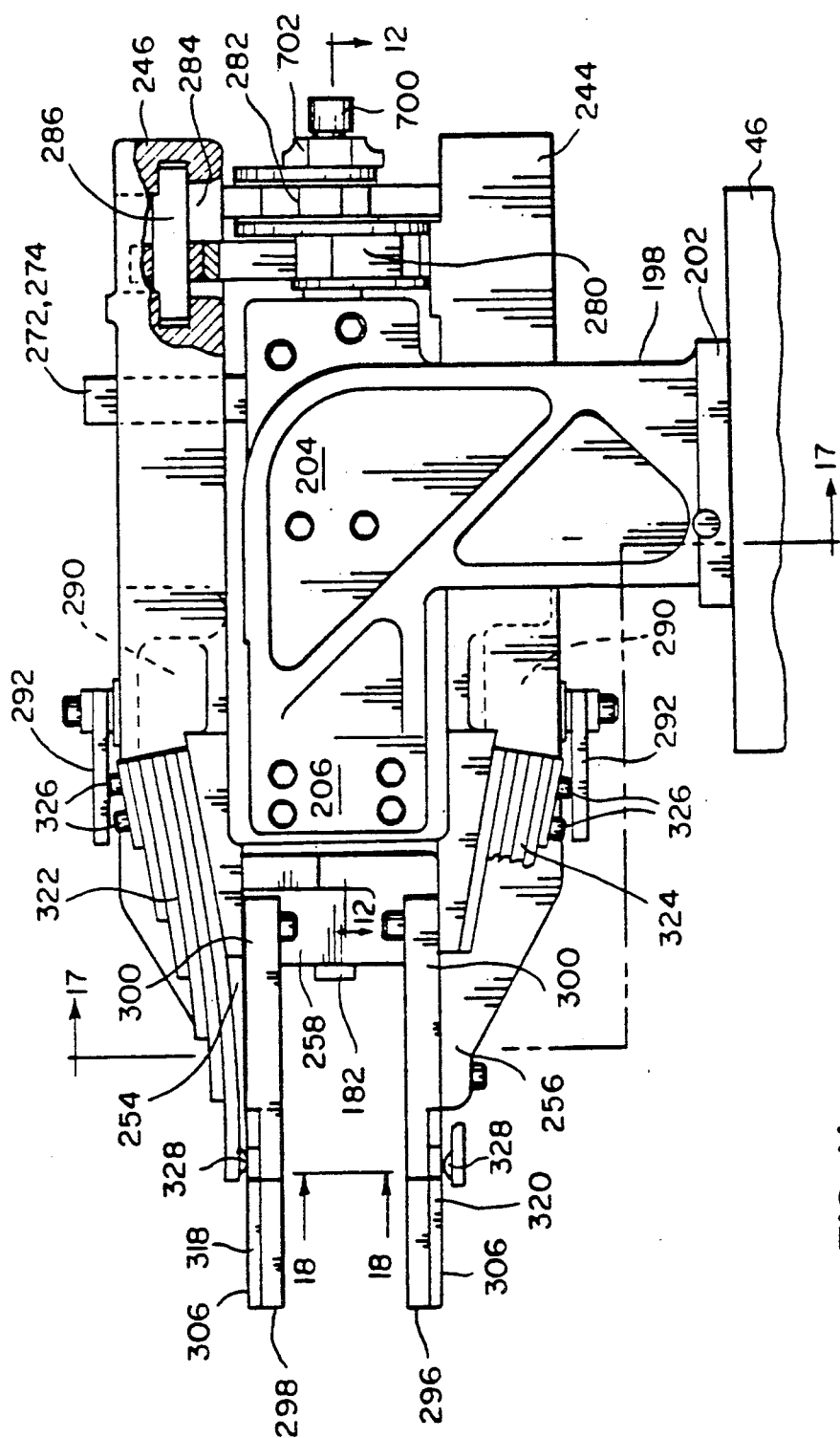
FIG. 11 shows a side elevation view of the mechanism according to the invention for applying end caps to the magazine and holding the caps on the magazine during transport to the staking mechanism.
Figure 12:
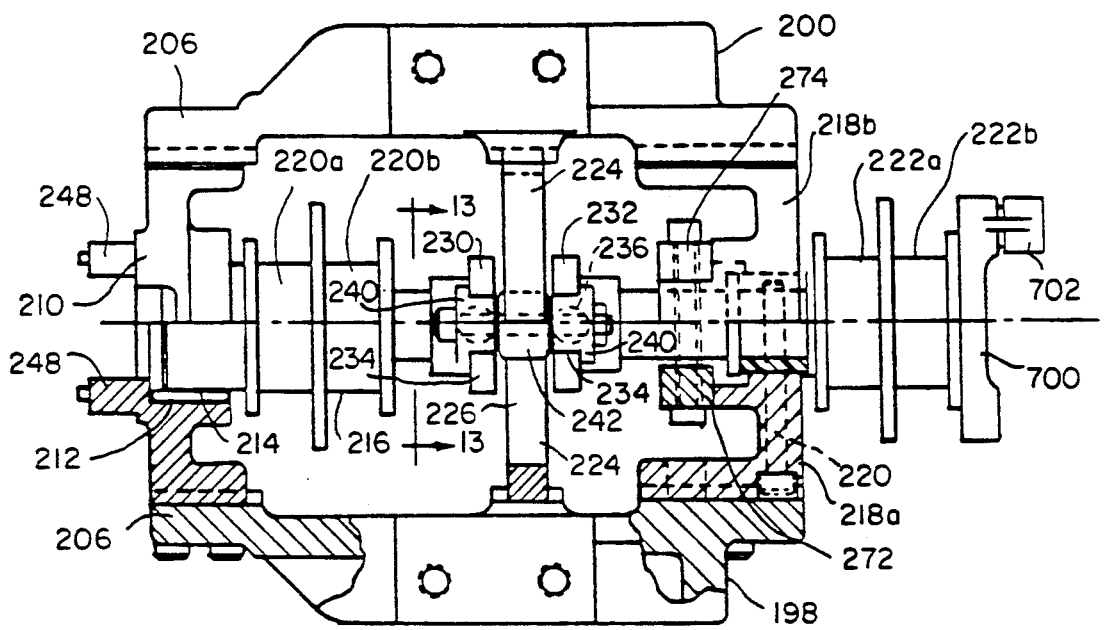
FIG. 12 shows a sectional view taken along line 12—12 of FIG. 11.
Figure 17:
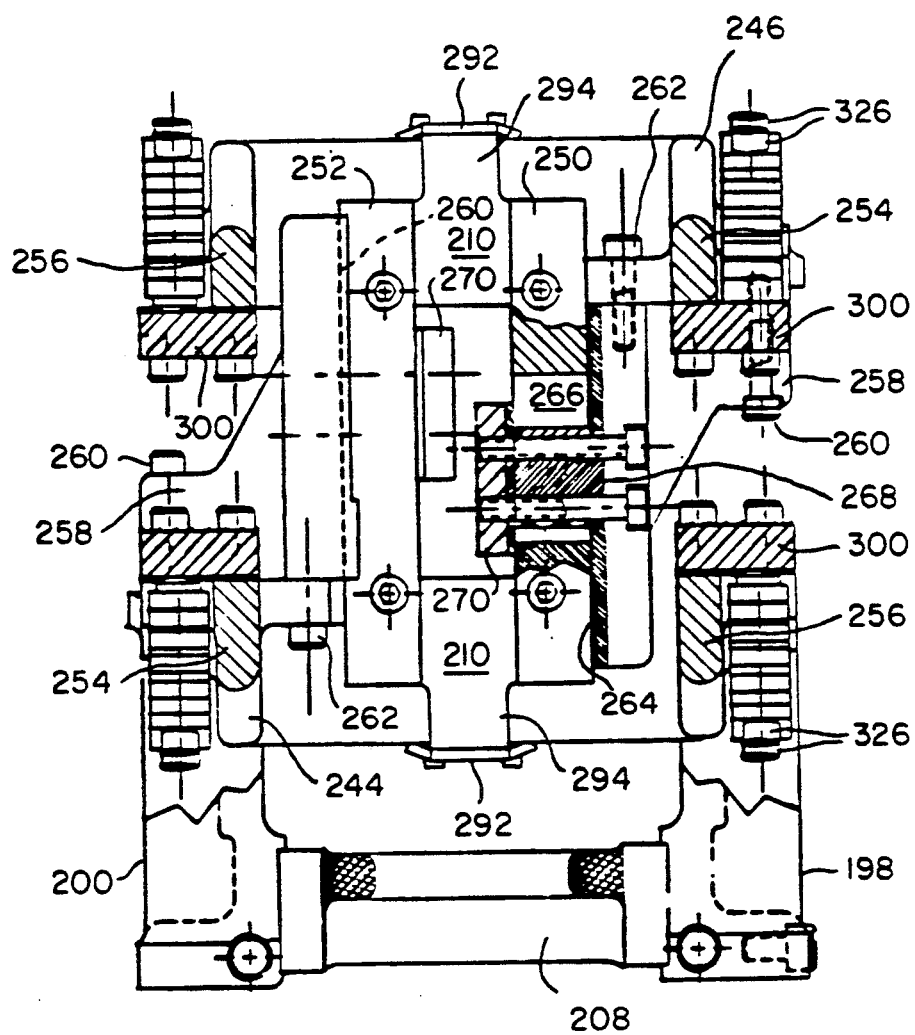
FIG. 17 sows a sectional view taken along line 17—17 of FIG. 11.

FIGS. 11 to 18 illustrate the structure of the end cap applying mechanism 48 according to the present invention. A pair of frame members 198,200, which are essentially mirror images of each other, are provided. Each frame member comprises a base flange 202 for rigid attachment to dial 46, an outwardly protruding leg 204 formed integrally with flange 202 and a radially extending arm 206 formed integrally with leg 204. As shown in FIG. 17, legs 204 are joined near base flanges 202 by a cross member 208. As shown in FIG. 12, the radially outer ends of arms 206 are joined by a bearing block 210 which comprises a central bore 212 for receiving a bearing 214 which supports one end of a crank shaft 216 extending lengthwise of mechanism 48. Near its other end, crank shaft 216 is supported by a two piece bearing block 218a,218b, the two pieces being attached respectively to frame members 198,200. Bearing block 218a,218b is assembled around crank shaft 216 by a pair of bolts 220, one passing on either side of crank shaft 216 and only one being shown in phantom in FIG. 12. Crank shaft 216 comprises two pairs of throws 220a,220b located adjacent to bearing block 210, and 222a,222b located on the opposite side of bearing block 218 from pair 220a,220b. The throws in each pair are positioned 180 degrees apart about the axis of crank shaft 216; so that, connecting rods riding on the throws of each pair will be moved in opposite directions as crank shaft 216 is rotated.

Figure 13:
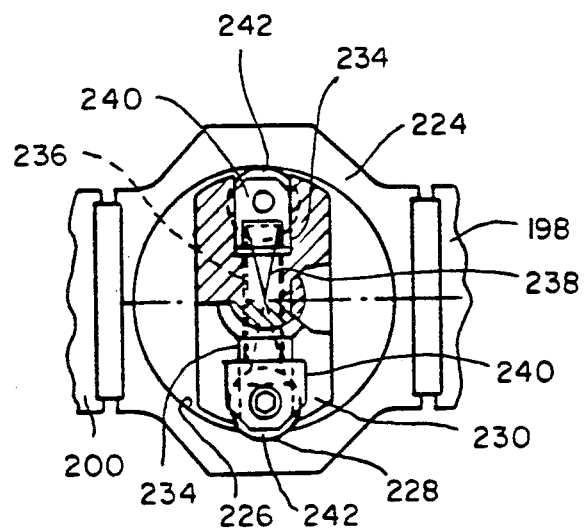
FIG. 13 shows a sectional view taken along line 13—13 of FIG. 12.

Approximately midway between bearing blocks 210,218, a detent ring 224 is rigidly connected between frame members 198,200 and around crank shaft 216 as shown in FIGS. 12, 13, and 14. A central bore 226 is provided in detent ring 224, the bore having a detent recess 228 on a diameter midway between frame members 198,200. On either side of detent ring 224, crank shaft 216 is provided with radially extending, integral flanges 230,232. Each flange includes diametrally oppositely inwardly extending slots 234 which are joined at their inner ends by a diametral bore 236 which houses a spring 238. Slidably mounted in each of slots 234 is a roller guide block 240, the pair of guide blocks mounted on opposite sides of diametral bore 236 being biased outwardly in slots 234 by spring 238. Between the guide blocks on flange 230 and those on flange 232 are mounted rollers 242 which are biased into contact with the surface of bore 226 in detent ring 224. Thus, for each 180 degrees of rotation of crank shaft 216, one of rollers 242 enters detent recess 228 to deter further rotation of crank shaft 216.

Rotation of crank shaft 216 actuates end cap applying mechanism 48. A pair of essentially identical, rugged platens 244,246 is positioned one on each side of crank shaft 216 between frame members 198,200. Preferably, platens 244,246 are ductile iron castings. In use of mechanism 48, platens 244,246 are moved toward each other to apply end caps and away from each other to release a completed magazine. To constrain platens 244,246 to essentially parallel movement, guides are provided at both of bearing blocks 210,218. As best seen in FIGS. 12 and 14, bearing block 210 includes spaced, radially extending protrusions 248 which support a pair of guide posts 250,252 extending essentially perpendicular to the surface of dial 46. Each of platens 244,246 comprises a radially outwardly opening yoke having a pair of side arms 254,256. As seen in FIGS. 11 and 17, attached to the side of each arm 254 which faces arm 256 on the opposite platen is a guide support block 258 secured by oppositely extending bolts 260 and 262. As seen in FIG. 17, support block 258 includes an elongated guide surface 264 which may be covered with a suitable self lubricating material such as Oilite, Teflon or Delrin and which bears against a flat side of one of guide posts 250,252. Guide posts 250,252 are provided with intermediately located elongated slots 266. A spacer block 268 is captured in each slot by a back block 270 held by bolts extending from support block 258. The surface of back block 270 contacting guide posts 250,252 is covered with a suitable self lubricating material. Thus, as platens 244,246 move up and down as viewed in FIG. 17, their motion is guided by surfaces 264 and blocks 270 as they slide along fixed guide posts 250,252. Thus, guide posts 250,252 restrain both radial and tangential movement relative to assembly dial 46.

Guidance against tangential movement relative to assembly dial 46 is provided at bearing block 218 as best seen in FIGS. 12 and 14. A pair of rectangular crosssection guide posts 272,274 are attached to opposite sides of bearing block 218 by means of bolts passing on either side of crank shaft 216. Guide posts 272,274 extend parallel to guide posts 250,252 and pass outwardly from bearing block 218 through openings 276 in platens 244,246. Attached to the inner side of each of platens 244,246 and extended across opening 276 is a bearing block 278 having flat side surfaces which slidably engage the flat side surfaces each of guide posts 272,274. Thus, as platens 244,246 move up and down as viewed in FIG. 11, their motion is guided by fixed guide posts 272,274.

Platens 244,246 are operatively connected to crank shaft 216 by pairs of connecting rods mounted on crank throws 220a,220b and 222a,222b. To simplify illustration, only one pair of connecting rods 280,282 is shown in FIG. 11, the pair mounted on crank throws 221a,222b. Connecting rod 280 extends outwardly into an opening 284 in platen 246 where it is rotatably connected to a wrist pin 286 extending across opening 284. A similar arrangement, not illustrated, operatively connects connecting rod 282 to platen 244. At crank throws 220a,220b, a further pair of connecting rods, not illustrated, is mounted between the crank throws and wrist pins 288 extending across hollows 290 in the inner side of each platen, as seen in FIGS. 11, 14, and 16. Thus, as crank shaft 216 is rotated, platens 244,246 move toward each other during an initial 180 degrees of rotation, at which time one of rollers 242 engages detent recess 228; and then away from each other during the next 180 degrees of rotation, at which time the other of rollers 242 engages detent recess 228. To more securely hold the platens in their closest position following application of end caps to a magazine as will be described subsequently, each of platens 244,246 is provided on its outer surface with a cantilevered leaf spring 292 which extends over the space between side arms 254,256 of the platen yoke. When the platens are brought to their closest position, each spring 292 bears resiliently against an outward extension 294 of bearing block 210, thereby biasing the platens toward their open position and taking up any back lash in the crank mechanisms. This maintains a consistent dimension between the end cap applying anvils discussed in the next paragraph and gives repeatable, accurate end cap to end cap dimensions on the completed magazine.

Actual application of end caps is accomplished by a pair of juxtaposed tools 296,298 mounted on the inner sides of side arms 254,256. Each tool 296,298 comprises a face plate 300 supported on the inner sides of side arms 254,256 and extended across the opening of the platen yoke. As shown in FIG. 15, a bore 302 is provided through face plate 300, within which a plastic bushing 304 is seated. Mounted within bushing 304 is an end cap applying anvil 306 which is made from a magnetic material. As shown in FIGS. 14 and 15, anvil 306 comprises a central portion 308 having an outwardly opening concavity 310 surrounding a central bore 312. Concavity 310 and central bore 312 provide access to a loaded magazine held between anvils 306, as will be described in more detail subsequently and also facilitate detection of missing or misaligned end caps using optical mean, for example, not illustrated. At its inner end, central bore 312 is provided with a counter bore 314 for receiving end caps 24 in a manner to be described subsequently. At its outer end, central bore 312 is provided with a plurality of peripheral notches 316 which provide alternate magnetic pole locations for magnetic retention of the end caps and also cooperate with a finished magazine ejector at magazine removal station 62. Magnetization of anvils 306 to provide such alternate poles can be achieved using conventional techniques, such as those described in the *Permanent Magnet Design and Application Handbook*, Robert E. Krieger Publication Company, Malabar, Fla. 1986. Anvil 306 further comprises laterally extending portions 318,320 which rest on the outer surface of base plate 300. Normally, anvils 306 follow base plates 300 during application of an end cap unless there is an exceptional situation, such as a cocked magazine. They then will move relative to base plates 300 to relieve the problem and prevent damage. The anvils close only to a fixed spacing, rather than until the end caps bottom out on the closed shell, which helps to control dimensions of the completed magazine. During such execeptional situations, portions 318,320 tend to rise slightly above the surface of base plate 300 as anvil 306 moves slightly through bushing 304. The force applied to anvil 306 is controlled by a pair of cantilevered leaf spring assemblies 322,324 which are attached by suitable bolts 326 to the platens just outside the yoke of the platen adjacent to side arms 254,256. The free ends of spring assemblies 322,324 are provided on their inner sides with plastic contact buttons 328 which bear on the ends of laterally extending portions 318,320, thereby resisting movement of anvils 306 through bushing 304.

Figure 18:
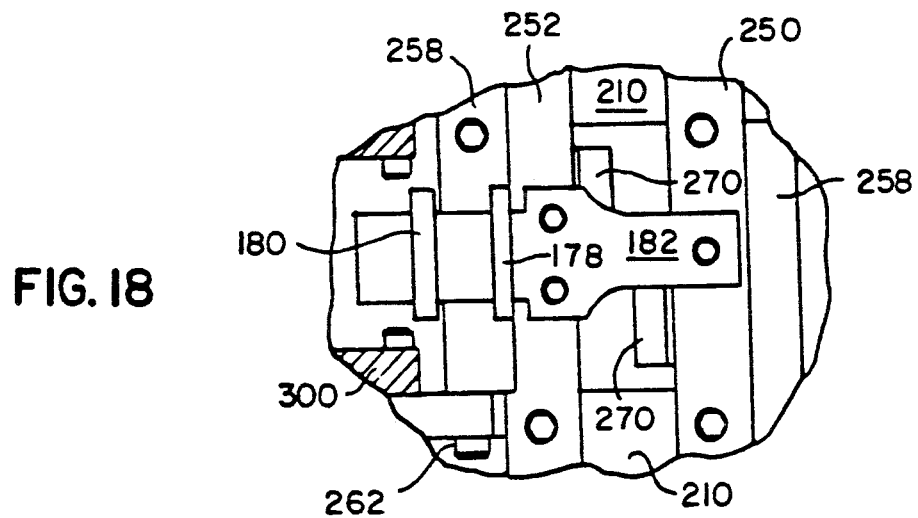
FIG. 18 shows a fragmentary view taken along line 18—18 of FIG. 11.

FIG. 18 shows a view along line 18—18 of FIG. 11, in which a reference datum plate 182 is shown attached to the radially outer faces of guide posts 250,252. Datum plate 182 extends toward the side of end cap applying mechanism 48 which supports shell removal mechanism 44, as previously described. Mounted on datum plate 182 are a pair of laterally spaced positioning bars 178,180 which cooperate with reference edges 156,158 of fixed claws 142,144 of the shell removal mechanism. Thus, when the shell removal mechanism 44 is swung between anvils 306, it comes to rest with edges 156,158 contacting positioning bars 178,180 and very open shell 28 positioned opposite central bores 312, as indicated schematically in FIG. 4.

END CAP PLACING MECHANISM 50

Figure 21:
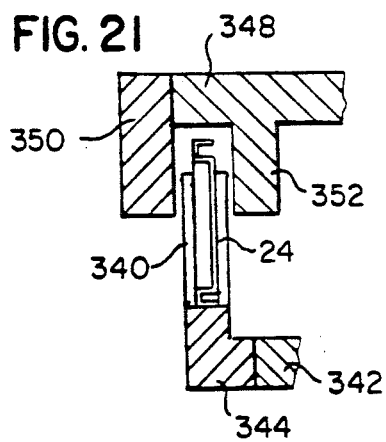
FIG. 21 shows an enlarged fragmentary view of the mechanism of FIG. 20, illustrating how the end caps are retained by the star wheels.
Figure 20:
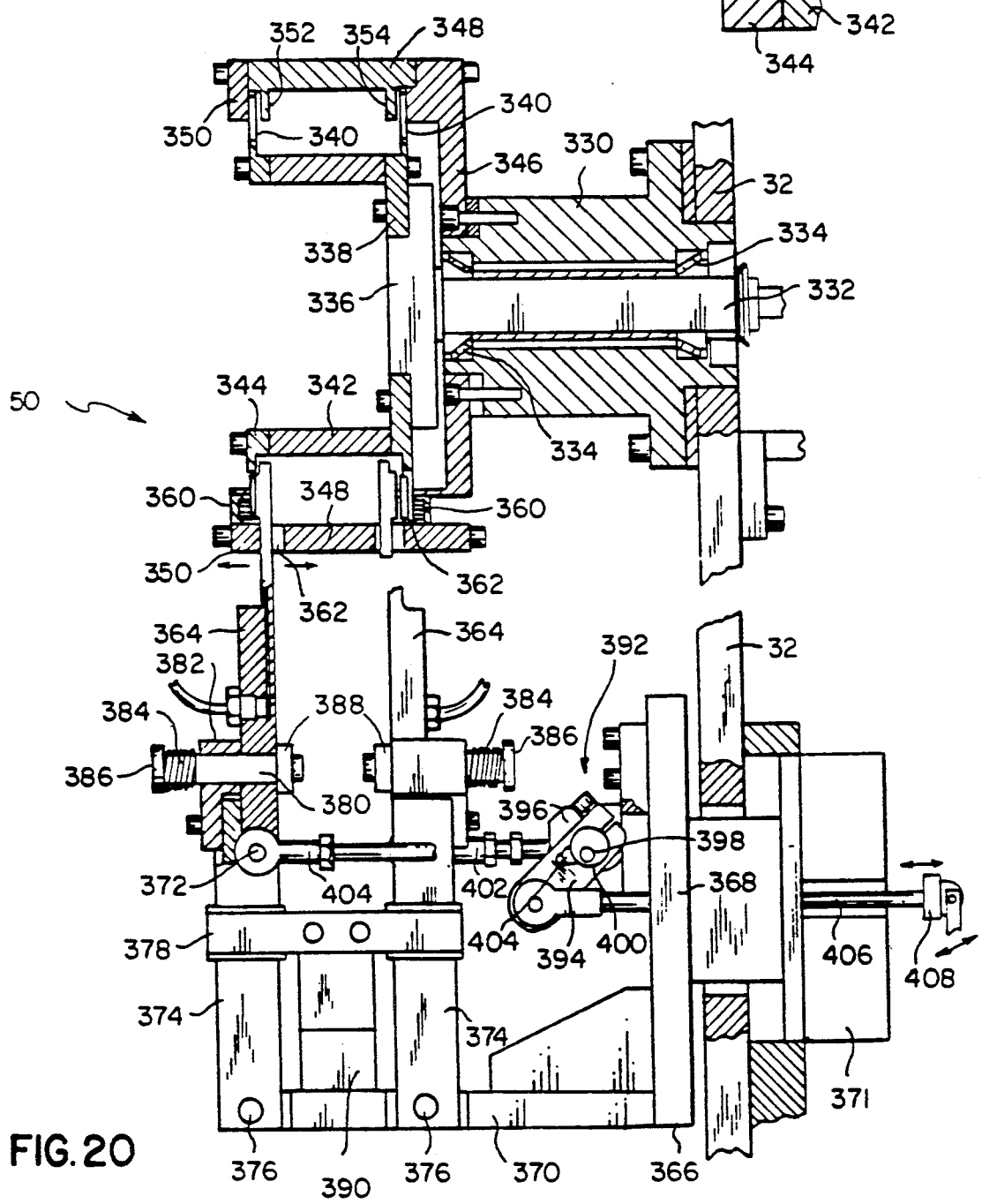
FIG. 20 shows a side elevation view, partially in section, of the mechanism of FIG. 19.

FIGS. 19, 20 and 21 illustrate details of end cap placing mechanism 50. A standoff housing 330 is attached to face plate 32 above assembly dial 46 and rotatably supports a shaft 332 on a pair of bearings 334. Shaft 332 may be driven by a conventional indexer, not illustrated. At its outer end, shaft 332 is provided with a hub 336 to which is attached a first annular star wheel 338 having spaced around its circumference a plurality of semicircular recesses 340 for receiving end caps 24. An annular spacer 342 is attached at its inner end to first star wheel 338 and at its outer end to a second star wheel 344 also having a plurality of recesses 340 axially aligned with those of star wheel 338. Surrounding the assembly of hub 336, star wheels 338,344 and annular spacer 342, is a housing comprising a back guide ring 346 mounted on the outer end of stand off housing 330, an outside annular spacer 348 attached at its inner end to guide ring 346 and at its outer end to a front guide ring 350. As shown in FIG. 21, outer guide ring 350 extends radially inwardly past the circumference of star wheel 344; so that, end caps 24 carried in recesses 340 are prevented from falling out. Back guide ring 346 is similarly sized for recesses 340 in star wheel 338. To keep end caps 24 from falling in the opposite directions, outside annular spacer 348 is provided with circumferentially and radially extending flanges 352,354 which extend radially inwardly past the circumference of the adjacent star wheels. End caps 24 are fed into recesses 340 from a pair of chutes 356, one of which is visible in FIG. 19, which extend through outside annular spacer 348 and gravity feed the end caps into recesses 340 as star wheels 338,344 are rotated by shaft 332.

As star wheels 338,344 rotate clockwise as seen in FIG. 19, end caps 24 carried in recesses 340 eventually reach the lowermost point 358 in the rotation of the star wheels, where they are removed from the star wheels for placement in end cap applying mechanism 48. On either side of point 358, guide rings 346,350 are provided with a plurality of circumferentially spaced permanent magnets 360 which hold the end caps against the guide rings at this location, to prevent their dropping out through arcuate radial slots 362 provided through annular spacer 348. Slots 362 and corresponding gaps in flanges 352,354, not illustrated, provide access to end caps 24 by a pair of vacuum gripper arms 364 rotatably supported by face plate 32 adjacent to the assembly of star wheels. A frame 366 is mounted for rotation in front of face plate 32 and comprises a back plate 368 rigidly attached to an outwardly projecting base plate 370. Back plate 368 is connected through an opening in face plate 32 to a conventional oscillator 371 mounted on the opposite side of face plate 32. Each vacuum gripper arm 364 is pivotably attached by a pin 372, only one of which is visible in FIG. 20, to an actuator arm 374 which in turn is pivotably attached to base plate 370 at pin 376. To provide a limited range of rotation of actuator arm 374 relative to back plate 368, side guides 378 are provided. To provide a limited range of movement of vacuum gripper arm 364 relative to actuator arm 376, a breakaway pin 380 is provided which extends through a bore in vacuum gripper arm 364 above pin 372 and a bore provided in a bearing block 382 attached to the upper end of actuator arm 374. A spring 384 is captured between a head 386 on breakaway pin 380 and bearing block 382 and the opposite end of pin 380 is secured with a clamping collar 388. Pivoting movement of actuator arms 374 is limited by side guides 378 supported between the arms on a leg 390 attached to base plate 370.

The two assemblies of actuator arm 374 and vacuum gripper arm 364 are pivoted by means of a double eccentric mechanism 392 supported on the front face of back plate 368. A crank arm 394 is pivotably mounted between a pair of brackets 396, only one of which is visible in FIG. 20, by means of a shaft 398. The opposite ends of shaft 398 are provided with eccentric throws 400, only one of which is visible in FIG. 20, the throws being 180 degrees out of phase with each other. One throw is joined by a connecting rod 402, partially obscured in FIG. 20, to pin 372 of the nearer or right hand actuator arm 374; while the other throw is joined by a connecting rod 404, shown fragmentarily in FIG. 20, to pin 372 of the farther or left hand actuator arm 374. Thus, pins 372 perform the dual functions of pivotably connecting vacuum gripper arms 364 to actuator arms 374 and of pivotably connecting rods 402,404 to the respective assemblies of vacuum gripper arm and actuator arm. Crank arm 394 is oscillated by an actuator rod 406 pivotably attached to the outer end of crank arm 394 and extended rearwardly through face plate 32 to a conventional oscillator, not illustrated. To permit actuator rod 406 to withstand the rotation of frame 366, a swivel bearing 408 is provided on the end of rod 406 remote from crank arm 394.

In operation of end cap placing mechanism 50, end caps 24 are fed into recesses 340 of star wheels 338,344 as the assembly of star wheels is stepped along in rotation. As end cap applying mechanism 48 is rotated by assembly dial 46 into position to receive a pair of end caps, indexer 371 is actuated to rotate vacuum gripper arms 364 into the positions shown in FIG. 20, with the tips of the vacuum gripper arms spaced from the end caps in recesses 340, as shown for the right hand vacuum gripper arm in FIG. 20. Actuator rod 406 is then pulled toward the back of face plate 32, so that double eccentric mechanism 392 causes connecting rod 404 to move to the left and connecting rod 402 to move to the right, as illustrated in FIG. 20. Such movement of the connecting rods causes the tips of the vacuum gripper arms to move apart from each other into contact with end caps 24 in recesses 340, as shown for the left hand vacuum gripper arm in FIG. 20. In practice, the vacuum gripper arms are caused to overtravel slightly as they are moved apart, to ensure that end caps 24 are properly acquired from star wheels 338,344 and, as will be subsequently discussed, deposited within anvils 306. Vacuum is then applied to the gripper arms to pull end caps 24 away from magnets 360. Actuator rod 406 is then pushed toward the front of face plate 32, so that double eccentric mechanism 392 causes the tips of the vacuum gripper arms to move toward each other away from recesses 340 while carrying a pair of end caps 24. Oscillating drive 371 is then actuated to rotate vacuum gripper arms 364 downward into position between magnetic anvils 306 of end cap applying mechanism 48. Actuator rod 406 is then pulled toward the back of face plate 32, so that double eccentric mechanism 392 causes the tips of the vacuum gripper arms to move apart from each other and place end caps 24 within counterbores 314 of anvils 306, at which time the vacuum is released to leave the end caps magnetically held by the anvils. The overtravel of the vacuum gripper arms, previously discussed, ensures that end caps are properly deposited within the anvils. Actuator rod 406 is then pushed back toward the front of face plate 32, so that the tips of the vacuum gripper arms move toward each other away from anvils 306. Finally, oscillating drive 371 is actuated to rotate vacuum gripper arms 364 back to the position shown in FIG. 20 where, in the meantime, a new pair of end caps has been moved in position for delivery to the next end cap applying mechanism 48 rotated into position on dial 46.

After the end cap applying mechanism has been provided with a pair of end caps 24, assembly dial 46 is indexed to bring the next end cap applying mechanism into position for receiving its end caps. Eventually, each end cap applying mechanism 48 reaches magazine assembly station 52, where a prewound spool of film will be inserted into very open shell 28, the shell will be closed and end caps 24 will be applied. When each end cap applying mechanism 48 has reached assembly station 52, the radially outer ends of the mechanism come to rest between the inboard and outboard skewer mechanisms illustrated in FIGS. 27 to 31, to be described subsequently. In this position of end cap applying mechanism 48, lips 20c,20t of very open shell 28 are oriented so that the shell opens essentially downwardly, as illustrated schematically in FIG. 4, thus permitting a prewound spool of film to be inserted from below.

WOUND SPOOL TRANSFER MECHANISM 56

Figure 22:
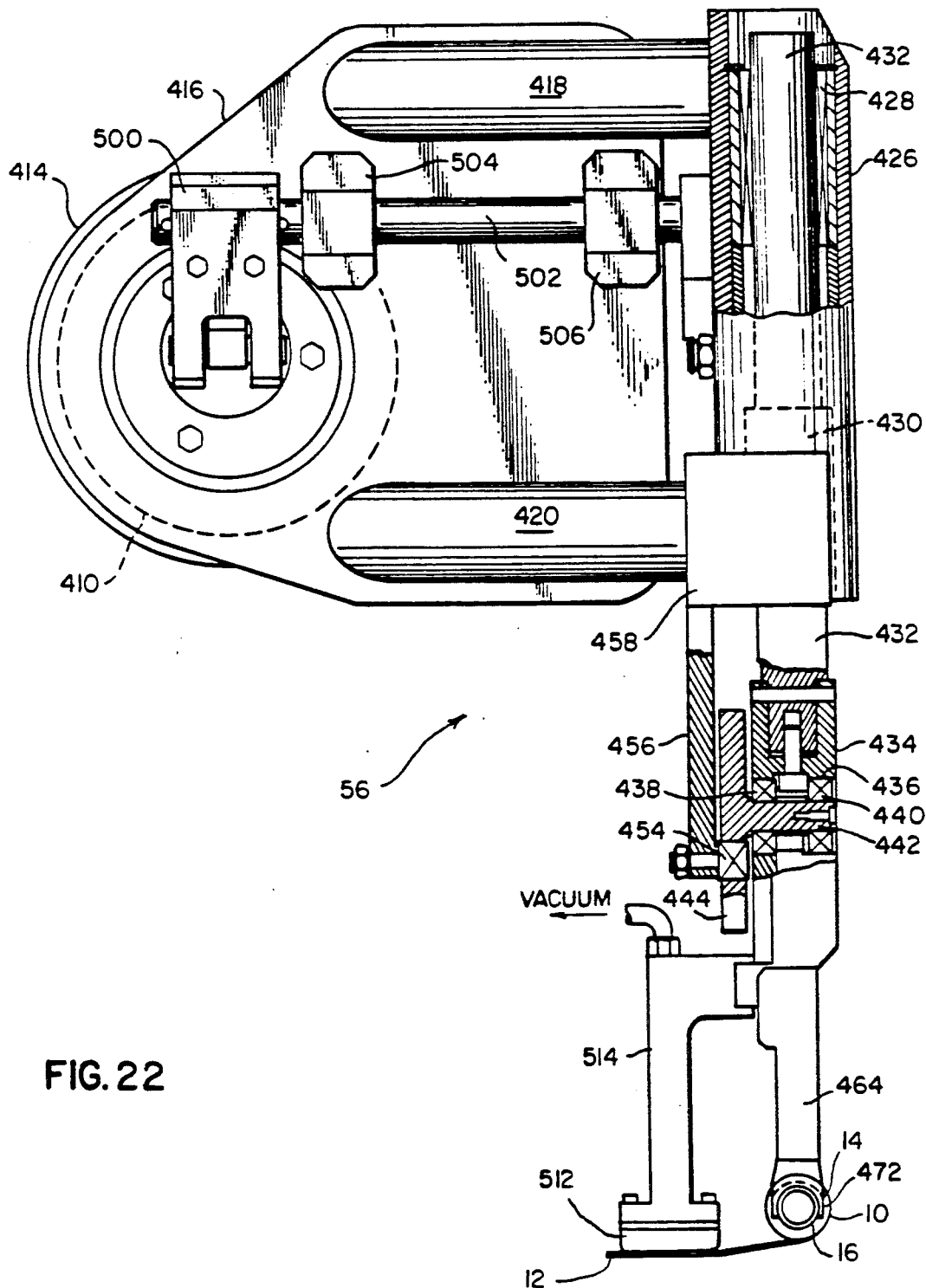
FIG. 22 shows a front elevation view, partially in section, of the mechanism for transferring a prewound spool into a preformed shell.
Figure 23:
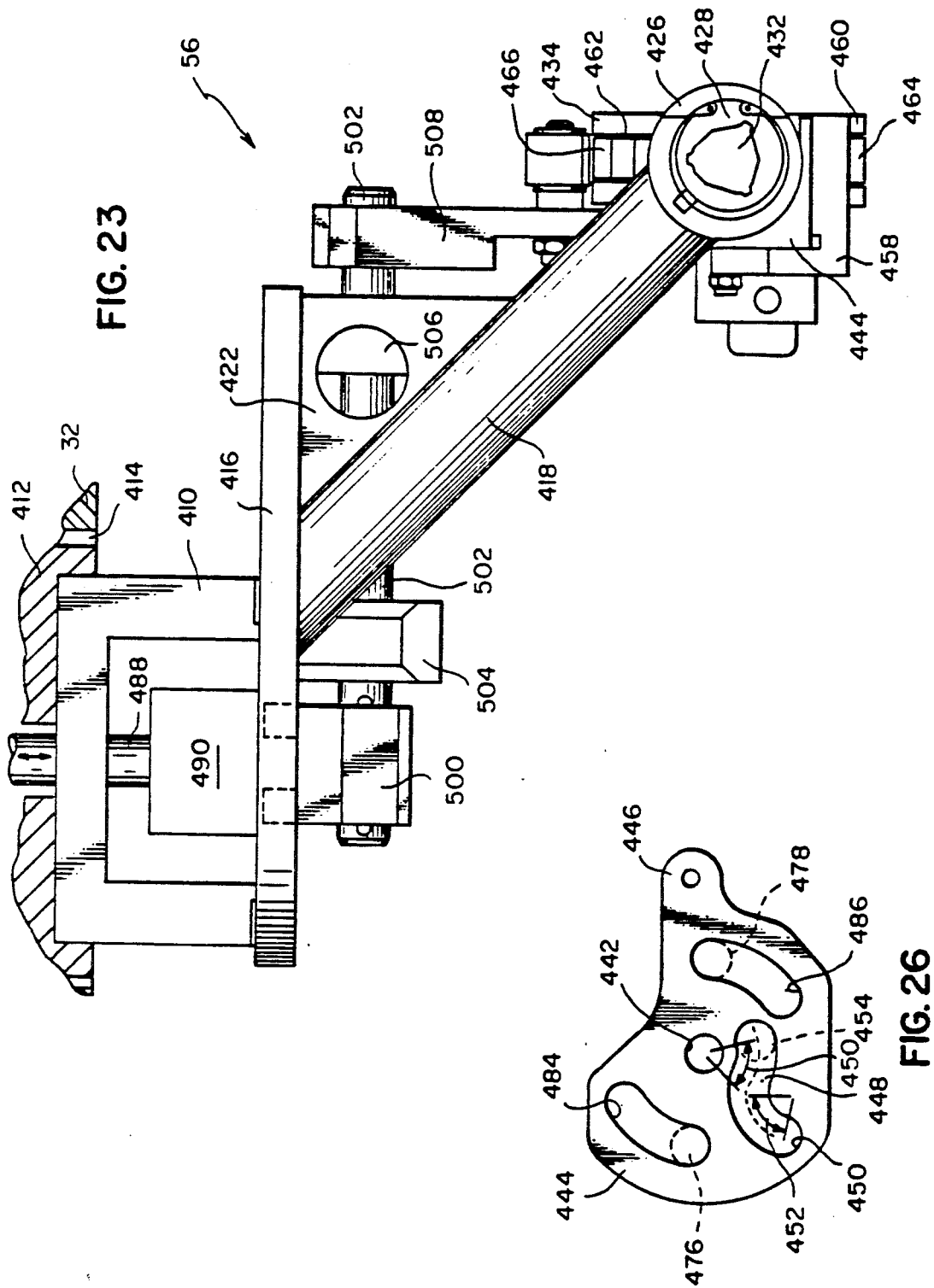
FIG. 23 shows a top plan view of the mechanism of FIG. 22.
Figures 24, 25:
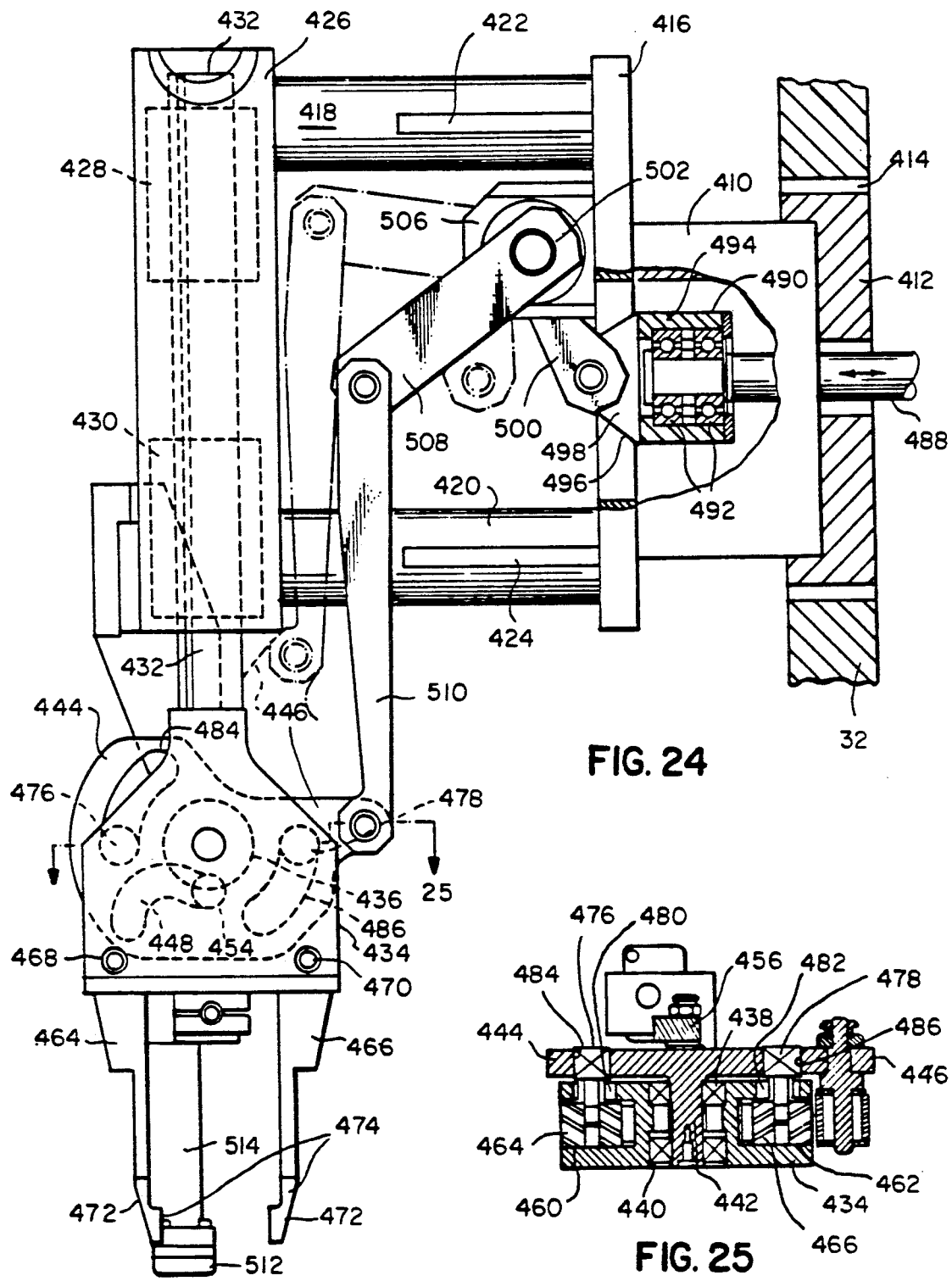
FIG. 24 shows a side elevation view, partially in section, of the mechanism of FIG. 22.
FIG. 25 shows a section view taken along line 25—25 of FIG. 24.

When end cap applying mechanism 48 has come to rest, the wound spool transfer mechanism 56 illustrated in FIGS, 22 to 26 is actuated to insert a prewound spool into very open shell 28. Wound spool transfer mechanism 56 comprises a circular frame base 410 which is attached to the output hub of a conventional oscillator 412, through a hole 414 in face plate 32. As shown in FIG. 3, mechanism 56 is positioned to the left of magazine assembly station 52 and above spool winding station 54. A frame plate 416 is attached to the outer end of frame base 410 and extends to the right as illustrated in FIGS. 22 and 23. A pair of support tubes 418, 420 are rigidly attached to frame plate 416 and extend outward at an angle to frame base 410 as shown in FIG. 23. A pair of gusset plates 422, 424 complete the attachment of support tubes 418,420 to frame plate 416, as shown in FIGS. 23 and 24. At their outer ends, support tubes 418,420 are rigidly attached to a tubular housing 426 within which a pair of linear bushings 428,430 slidably support a spline shaft 432. Attached to the lower end of shaft 432 is a mounting block 434 having near its center as viewed in FIG. 24 a through bore 436 in which a pair of bearings 438,440 rotatably support the shaft 442 of a cam plate 444. As seen in FIGS. 24 to 26, cam plate 444 comprises a laterally extending arm 446 which is used to actuate the cam in a manner to be described. Just beneath the center of rotation of cam plate 444, as viewed in FIGS. 24 and 26, a sinuous through slot 448 is provided which comprises an arc 450 of constant centerline radius from the center of shaft 442, located close to the circumference of shaft 442; and an arc 452 of steadily increasing radius from the center of shaft 442. As shown in FIG. 26, the centerline of arc 452, shown in phantom, is essentially straight following an initial transition from arc 450. A static cam follower roller 454 is positioned within slot 448 by means of a downwardly depending static follower arm 456 which is attached to the lower end of tubular housing 426 by an integral mounting block 458. Due to the configuration of slot 448, pulling upward on laterally extending arm 446 will cause rotation of cam plate 444 in the counterclockwise direction as viewed in FIGS. 24 and 26, thus causing static roller 454 first to roll within arc 450 of constant centerline radius; so that, mounting block 434 remains stationary. However, as cam plate 444 continues to rotate in response to upward force applied to arm 446, static roller 454 is encountered by the essentially straight portion of arc 452 of steadily increasing radius; so that, without further rotation of cam plate 444, mounting block 434 and spline shaft 432 move upward until static roller 454 nears the end of arc 452 when cam plate 444 has reached the position shown in phantom in FIG. 24.

As seen in FIGS. 23 and 25, mounting block 434 is provided in its side surfaces with axial through slots 460,462 which extend from the bottom surface to the upper surface of the mounting block. Within slots 460,462 are pivotably mounted gripping fingers 464,466 by means of hinge pins 468,470 located above the lower ends of the slots. As seen in FIG. 22, at their lower ends gripping fingers 464,466 are provided with essentially semicircular fixed jaws 472 sized to fit readily over the hubs 16 of a prewound spool 10 of film. The inner surfaces of the lower ends of gripping fingers 464,466 are provide with flat surfaces 474 to frictionally engage flanges 14 of each spool, as shown in FIG. 24. Above flat surfaces 474, the gripping fingers are provided with reduced crossections to make them somewhat resilient, thus minimizing the chance for damaging a spool as the fingers close.

At their upper ends, gripping fingers 464,466 are provided with movable cam follower rollers 476,478 whose support axles extend, as shown in FIG. 25, through arcuate slots 480,482 in the side walls of slots 460,462 to permit rollers 476,478 to engage arcuate slots 484,486 in cam plate 444. Referring to FIG. 26, the center line radius of arcuate slot 486 from the center of shaft 442 is somewhat longer at the upper end of the slot than at the lower; while for arcuate slot 484, it is the center line radius at the lower end that is longer. Because of this change in centerline radius along slots 484,486, rotation of cam plate 444 in the counter clockwise direction in the manner previously described will cause the upper ends of gripping fingers 464,466 to move toward one another, thereby causing the flat surfaces 474 at the lower ends of the gripping fingers to move apart and releasing any spool previously held therebetween. When movable rollers 476,478 near the ends of slots 484,486 opposite to their positions in FIGS. 24 and 26, the shape of slots 484,486 causes rollers 476,478 to dwell so that the gripping fingers do not swing outward into contact with the anvils. At about the same time, static roller 454 enters the straight portion of slot 448; so that, further upward movement of mounting block 434 occurs without rotation of cam plate 444. Then, when cam plate 444 is acted upon by a force downward on laterally extending arm 446, mounting block 434 moves downward while static roller 454 is in the straight portion of slot 448 and stops when static roller 454 encounters the constant radius portion 450 of slot 448, at which time cam plate 444 begins to rotate in the clockwise direction, causing the upper ends of gripping fingers 464,466 to move outwardly and forcing flat surfaces 474 toward one another to grip a spool.

Cam plate 444 is rotated between the positions just described by the mechanism shown in the upper portions of FIGS. 22 to 24. An actuator shaft 488 extends through oscillating drive 412 from a conventional oscillator, not illustrated, which can move the shaft parallel to its axis as indicated by the arrows. Within frame base 410, actuator shaft 488 is operatively connected to a swivel bearing assembly 490 comprising a pair of bearings 492 whose inner races are fixed relative to shaft 488 and whose outer races are held within a bearing body 494. Opposite the end of shaft 488, a cap 496 is attached to bearing body 494 and provided with a flange 498 pivotably connected to an actuator link 500 rigidly attached to a drive shaft 502. A pair of bearing blocks 504,506 support drive shaft 502 and are attached to the front surface of frame plate 416. Drive shaft 502 extends beyond gusset plate 422 as seen in FIG. 23 and at its end is rigidly attached to one end of an intermediate link 508 whose opposite end is pivotably attached to one end of a cam plate link 510 whose opposite end is pivotably attached to laterally extending arm 446 of cam plate 444. Thus when actuator shaft 488 is moved to the left as seen in FIG. 24, drive shaft 502 is rotated clockwise to raise cam plate link 510 to the position shown in phantom, thereby applying a force essentially parallel to spline shaft 432, thus rotating cam plate 444 and translating the assembly of mounting block 434 and cam plate 444 in the manner previously described. Because of the presence of swivel bearing assembly 490, frame base 410, frame plate 416 and everything attached to them may be rotated by oscillating drive 412 while actuator shaft 488 is translating without rotation.

In operation of the mechanism shown in FIGS. 22 to 26, a prewound spool 10 is prepared at spool winding station 54 and presented by means not shown to the position shown in FIG. 22. At this position, the free end of the film strip 12 is acquired by a vacuum foot 512 secured to mounting block 434 by a downwardly depending arm 514. Vacuum applied to foot 512 by means not illustrated holds the free end of the film to prevent the film's unwinding during transfer to magazine assembly station 52. Gripping fingers 464,466 are lowered simultaneously over the hubs of spool 10 and moved laterally into secure engagement with flanges 14. Oscillating drive 412 is then actuated to rotate the assembly counterclockwise, as viewed in FIG. 22, until the prewound spool has been positioned within very open shell 28 held within end cap applying mechanism 48 at magazine assembly station 52. In this position, gripping fingers 464,466 are located outside fixed claws 142,144, thereby leaving the space between the fixed claws for insertion of the jaws of shell closing mechanism 58, as will be discussed subsequently.

SPOOL SKEWER MECHANISMS

Then, the skewer mechanisms shown in FIGS. 27 to 31 are actuated to accurately position the spool for closure of very open shell 28 and application of end caps 24. Just above magazine assembly station 52, face plate 32 supports a frame 516 for the skewer mechanisms provided to properly position prewound spool 10 within very open shell 28. Frame 516 comprises a base plate 518 attached to face plate 32 in front of an opening 520 through face plate 32. Attached to and extended outwardly from base plate 518 are essentially inverted U-shaped side plates 522,524, joined along their upper edges by top plate 526, along their outer edges by end plates 528,530 and along their lower edges by bottom plates 532,534. Base plate 518 is provided with an opening 536 opposite opening 520 in face plate 32. Supported on either side of opening 536 on the back side of base plate 518 is the skewer actuating mechanism 538 illustrated in detail in FIGS. 29 to 31. Mechanism 538 actuates an inboard skewer assembly 540 and an outboard skewer assembly 542. In the latter case, a dog leg, or U-shaped, link 544 extends outward from mechanism 538, upward between side plates 522,524, across the gap defined by the U-shaped side plates and downward through an opening, not illustrated, in bottom plate 534. After an end cap applying mechanism 48 has been indexed into magazine assembly station 52, as illustrated fragmentarily in FIG. 27, wound spool transfer mechanism 56 swings a prewound spool into position between magnetic anvils 306 and in approximate alignment with central bores 312 of the anvils. Mechanism 538 is then actuated to cause inboard skewer assembly 540 to move outwardly a fixed distance and stop with its skewer probe 546 inserted through the end cap 24 held by anvil 306 and into the inboard hub of the prewound spool. Acting through dog leg link 544, mechanism 538 causes outboard skewer assembly 542 to continue to move inwardly until its skewer probe 548 is inserted through the other end cap 24 and into the outboard hub of the prewound spool. To allow for some lateral mispositioning of the prewound spool, to compensate for variability in spool length and also to push the spool against the reference datum provided by the dwelling inboard skewer, outboard skewer probe 548 is enabled to retract somewhat into the housing of skewer assembly 542. Probe 548 is slidably mounted in a bushing 550 and on the opposite side of bushing 550 is provided with a piston 552 which moves in a bore 554 provided in the housing. The side of piston 552 opposite to probe 548 is constantly pressurized with air to provide a force to hold probe 548 outward, the air being permitted to bleed by the piston and escape through a vent passage 556 through the wall of the housing. After the prewound spool has been properly positioned by probes 546,548, shell closing mechanism 58, to be described subsequently, is actuated to close very open shell 28 about the prewound spool. The free end of the film strip 12 thus is held between lips 20c,20t. Wound spool transfer mechanism 56 then releases the spool and withdraws to pick up the next spool. With shell closing mechanism 58 still gripping the closed shell, end cap applying mechanism 48 is then actuated in a manner to be described subsequently, so that end caps 24 are applied to the closed shell. Shell closing mechanism 58 then withdraws, leaving the assembled magazine held by anvils 306. Mechanism 538 then causes skewer assemblies 540,542 to withdraw their probes from the assembled magazine, so that assembly dial 46 can be indexed to end cap staking station 60.

Figure 29:
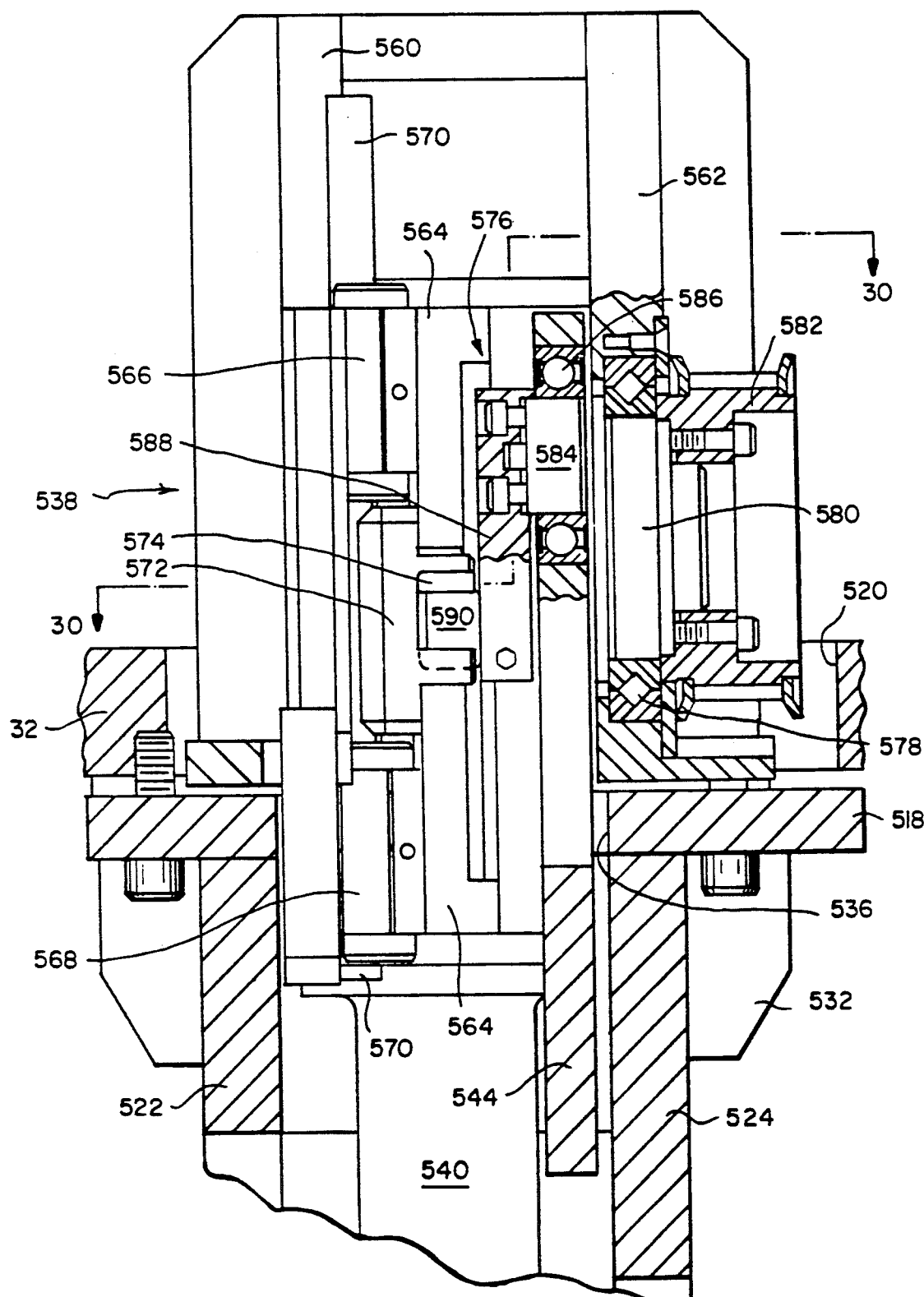
FIG. 29 shows a top view, partially in section, of the actuator mechanism for the mechanism of FIG. 27.
Figure 30:
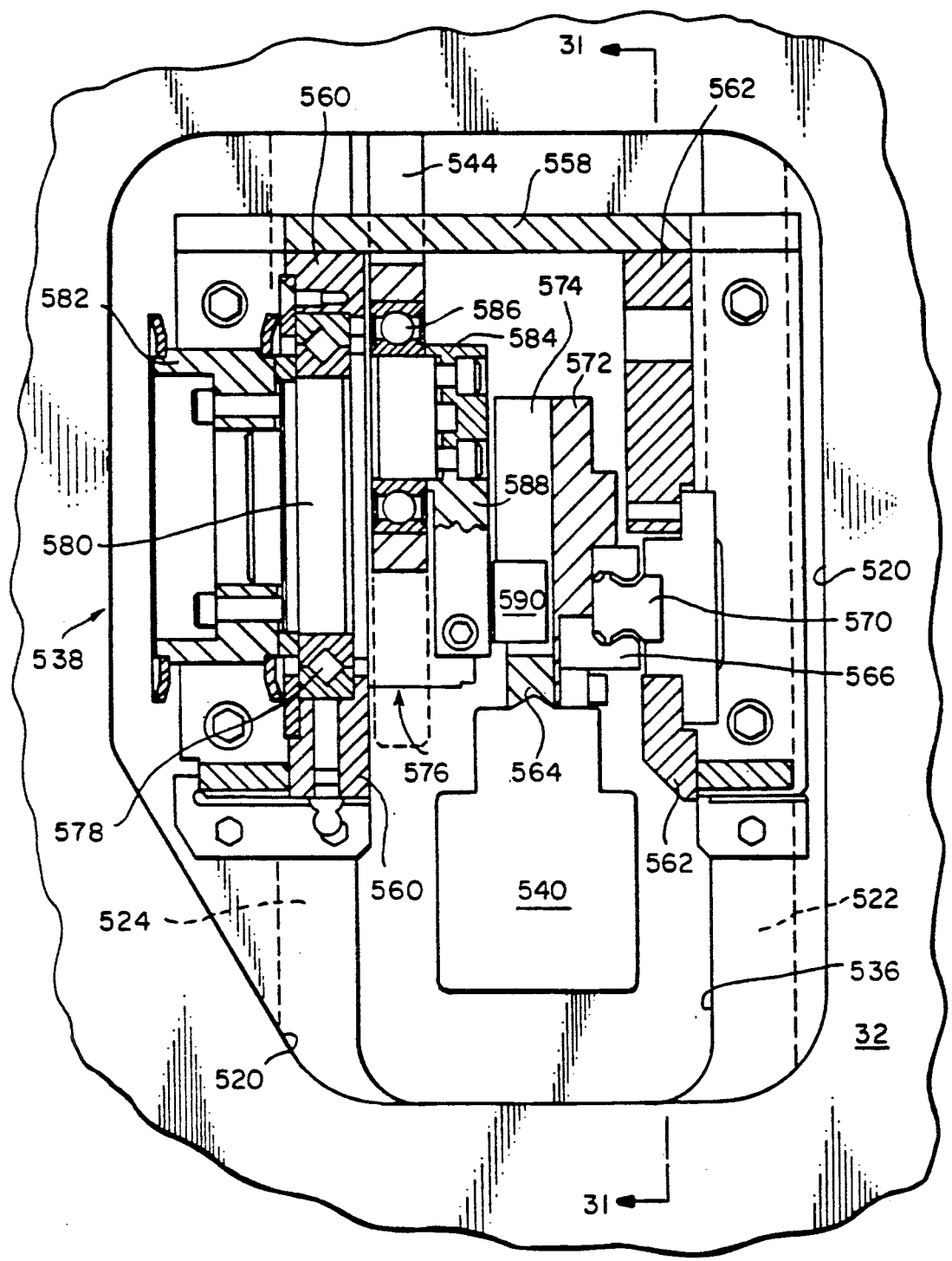
FIG. 30 shows a view taken along line 30—30 of FIG. 29.
Figure 31:
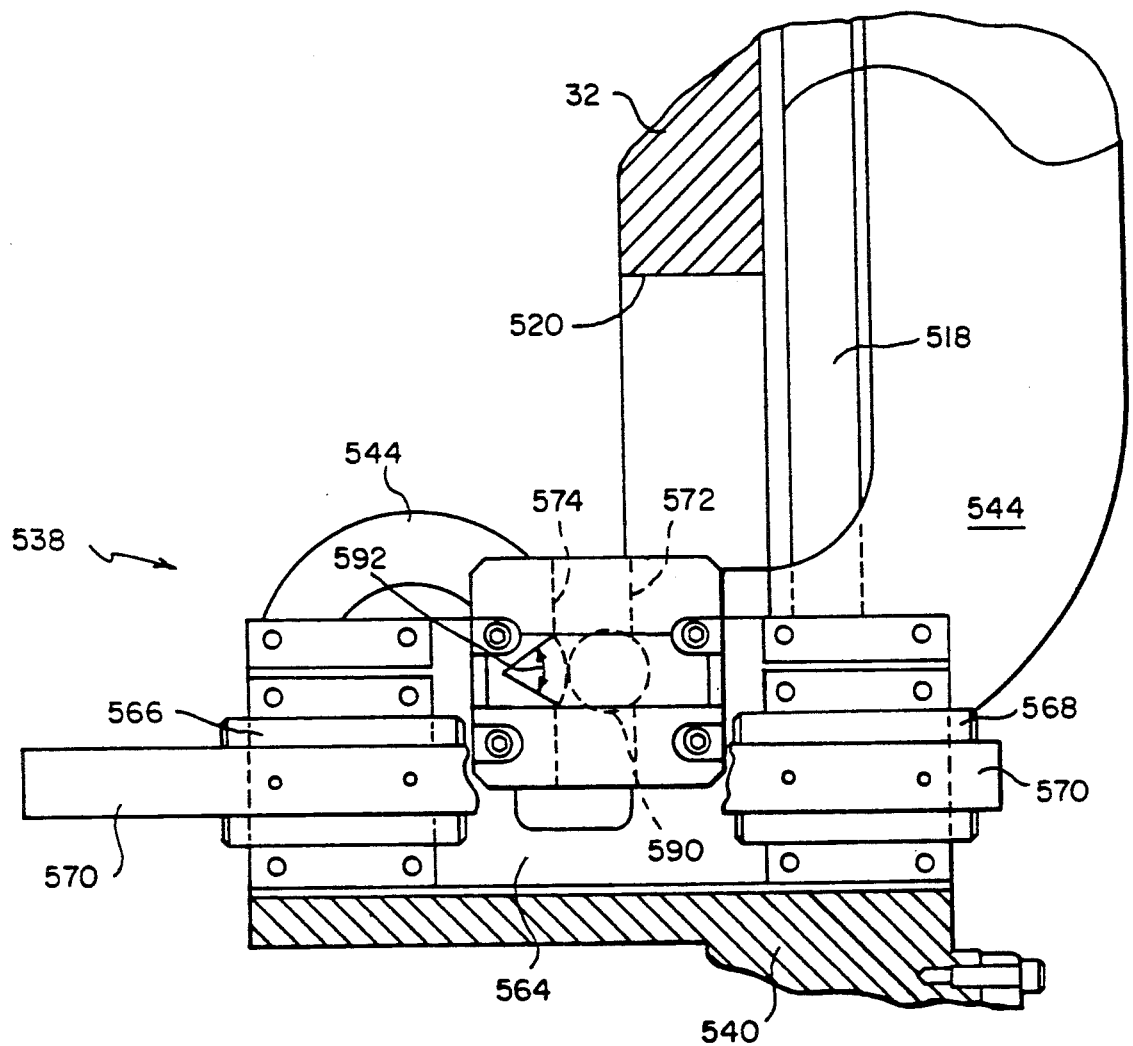
FIG. 31 shows a sectional view taken along line 31—31 of FIG. 30.

FIG. 29 shows a top view, partially broken away, of actuating mechanism 538; FIG. 30 shows a back view, partially broken away; and FIG. 31 shows a view taken along line 31—31 of FIG. 30. The housing for mechanism 538 is attached to the back side of base plate 518 and comprises a top plate 558 and a pair of rigidly attached depending side plates 560,562 between which inboard skewer mechanism 540 is mounted. The housing of mechanism 540 is provided with an upwardly extending mounting flange 564. On the side of flange 564 facing side plate 562 are mounted a pair of slides 566,568 which are slidably engaged with a rail 570 mounted on the side of side plate 562 facing flange 564. Thus mechanism 540 can move back and forth on rail 570. As seen in FIGS. 29 and 31, flange 564 is provided with a notch near its center to fixedly receive a cam block 572 having a sinuous cam slot 574 formed in its side facing side plate 560. Slot 574 extends transverse to the desired direction of movement of skewer assembly 540. To simultaneously move both cam block 572 and dog leg link 544, a double eccentric assembly 576 is mounted in side plate 560. A crank bearing 578 is mounted in side plate 560 and rotatably supports a crank 580 having on its outer end a drive pulley 582 and on its inner end an eccentric throw 584 which supports the inner race of a bearing 586 on whose outer race is mounted the inboard end of dog leg link 544. Drive pulley 582 may be driven by a conventional indexer, not illustrated. To the inner end of throw 584 is fixedly mounted one end of an oppositely eccentric throw or crank arm 588 at whose other end is mounted a cam follower roller 590 which rides in sinuous cam slot 574. Throw 584 and cam follower roller 590 are positioned 180 degrees apart relative to the axis of rotation of crank 580. Thus, as crank 580 is rotated by means not illustrated, the end of dog leg link 544 mounted on bearing 586 and cam block 572 will oscillate back and forth in opposite directions, causing skewer assemblies 540,542 to move into and out of engagement with the spool held by end cap applying mechanism 48. So that inboard skewer assembly 540 will cease movement before outboard skewer assembly 542 in the manner and for the purpose previously described, sinuous cam slot 574 is provided midway with a dwell segment 592 having a radius of curvature equal to that of the path of travel of cam follower roller 590. This causes inboard skewer assembly 540 to move toward the spool until segment 592 is encountered by cam follower roller 590, at which time skewer assembly 540 ceases movement until segment 592 is departed. While cam follower 590 is traversing segment 592 and skewer probe 546 is stationary, throw 584 causes probe 548 to continue to move into the hub of the spool. When probe 548 is properly positioned, mechanism 538 dwells briefly while the magazine is assembled.

Figure 28:
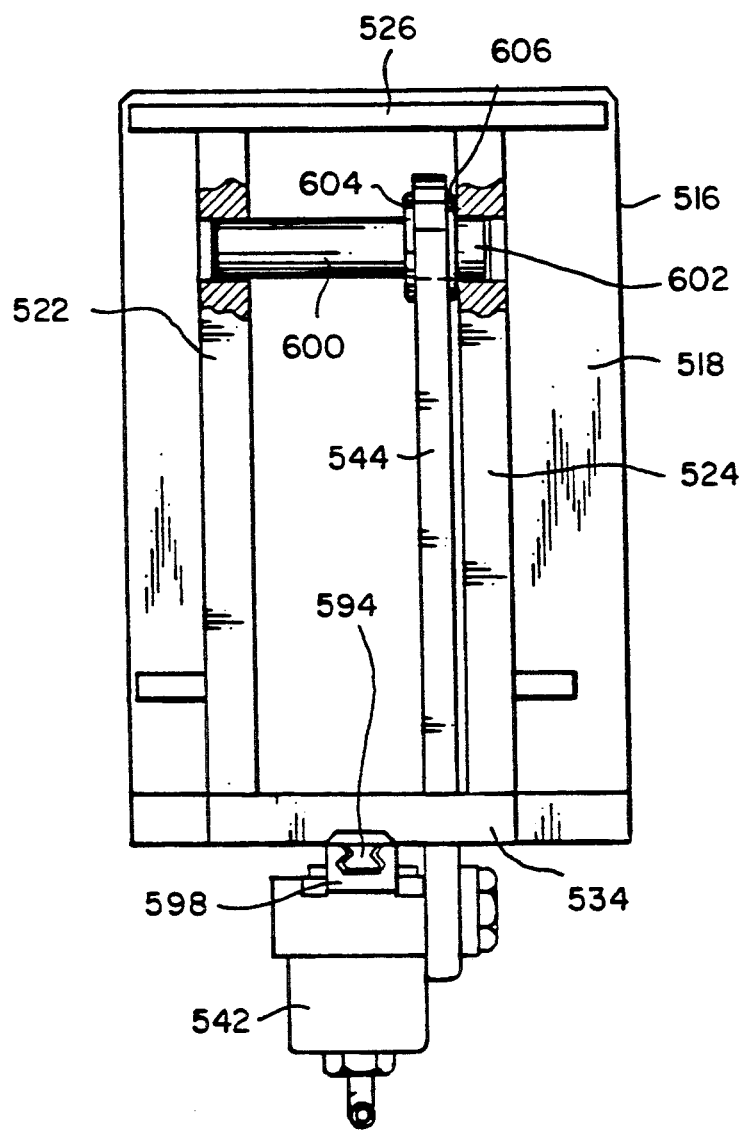
FIG. 28 shows a front elevation view of the mechanism of FIG. 27.

At the other end of dog leg link 544, as seen in FIGS. 27 and 28 outboard skewer assembly 542 is mounted to the underside of bottom plate 534 by means of a rail 596 mounted on bottom plate 534 and a pair of slides 596,598 mounted on the housing of skewer assembly 542. The end of dog leg link 544 is pivotably attached to the housing of skewer assembly 542 by means such as a spherical bearing. To prevent dog leg link 544 from tipping within frame 516, a pair of coaxial support posts 600,602 are rigidly mounted to side plates 522,524 near the upper end of the portion of link 544 which extends downwardly to skewer assembly 542. Posts 600,602 rub against wear plates 604,606 attached to opposite sides of link 544 and thus hold link 544 in an upright position during its periodic movements.

SHELL CLOSING MECHANISM 58

Figure 32:
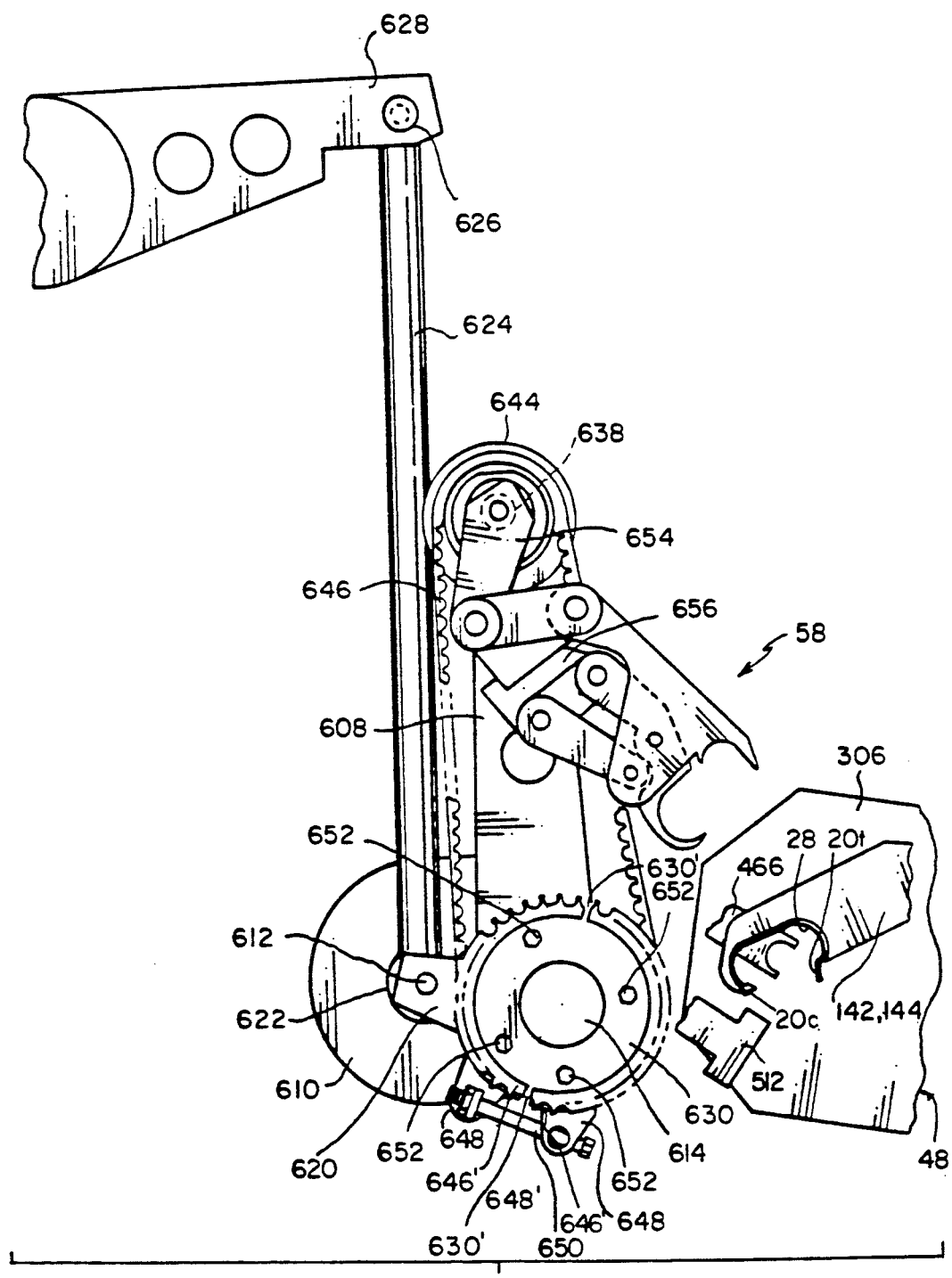
FIG. 32 shows a front elevation view of the mechanism for closing a very open shell about a prewound spool, in its retracted position.
Figure 33:
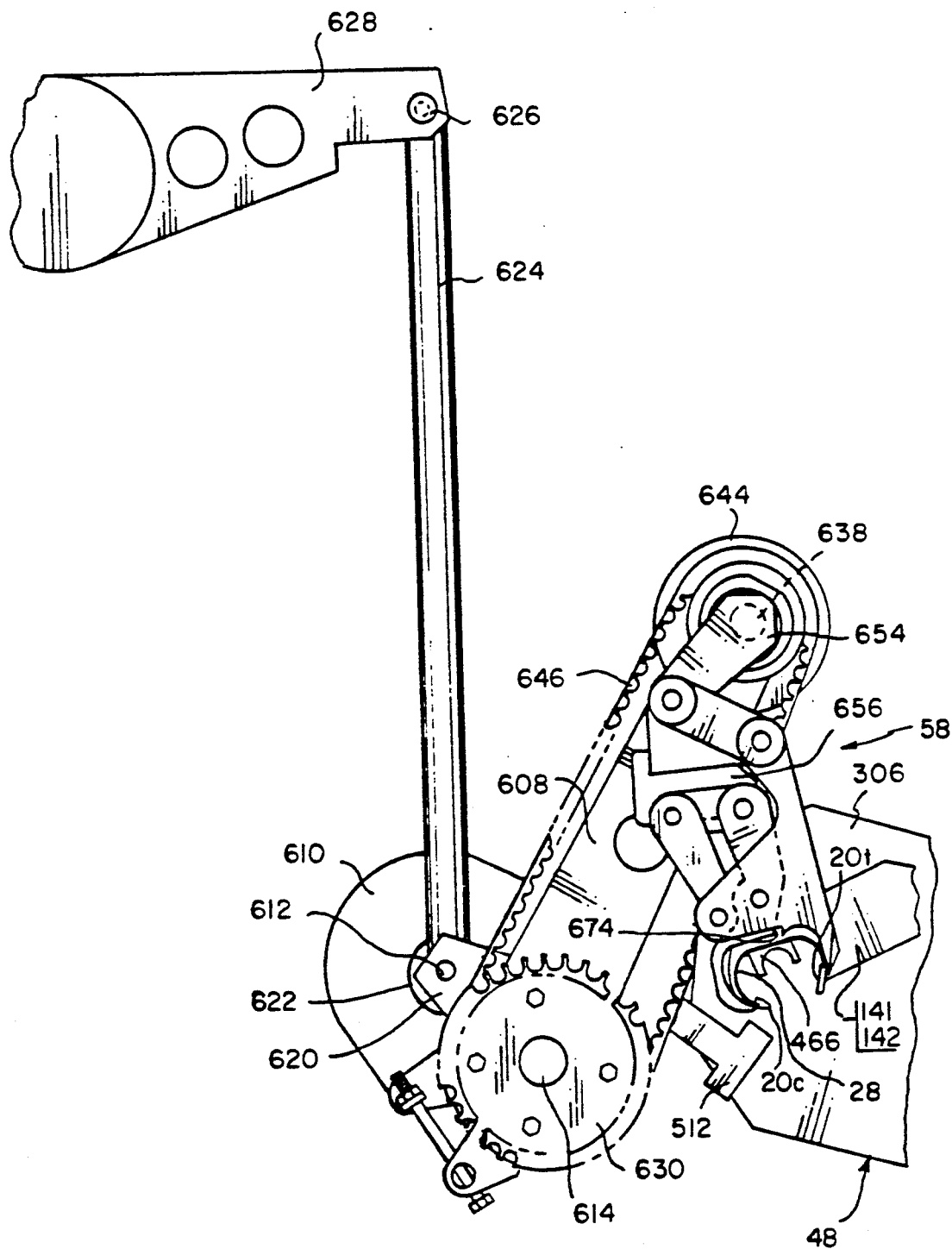
FIG. 33 shows the mechanism of FIG. 32 in its extended, open position.
Figure 34:
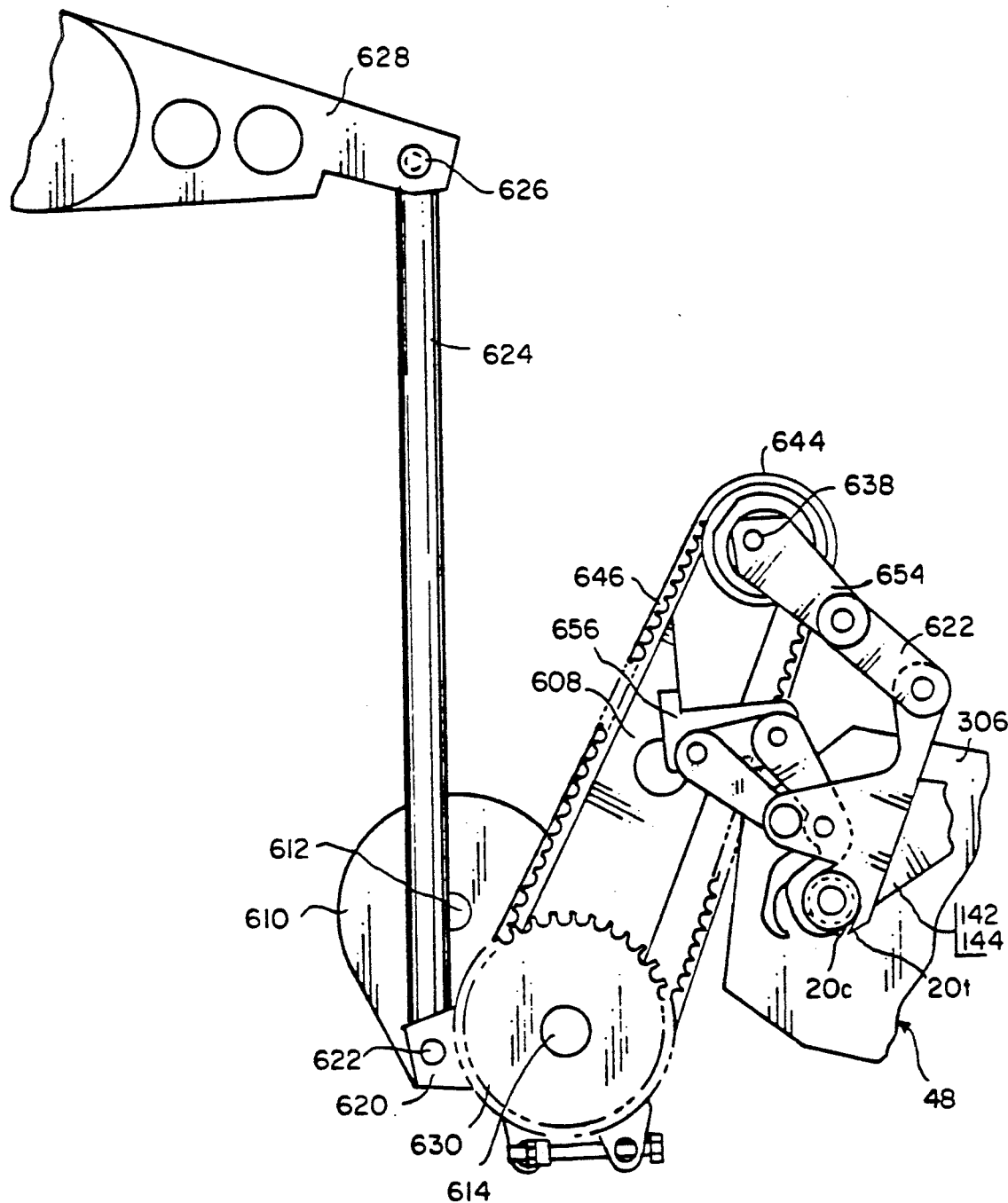
FIG. 34 shows the mechanism of FIG. 32 in its extended, closed position.
Figure 35:
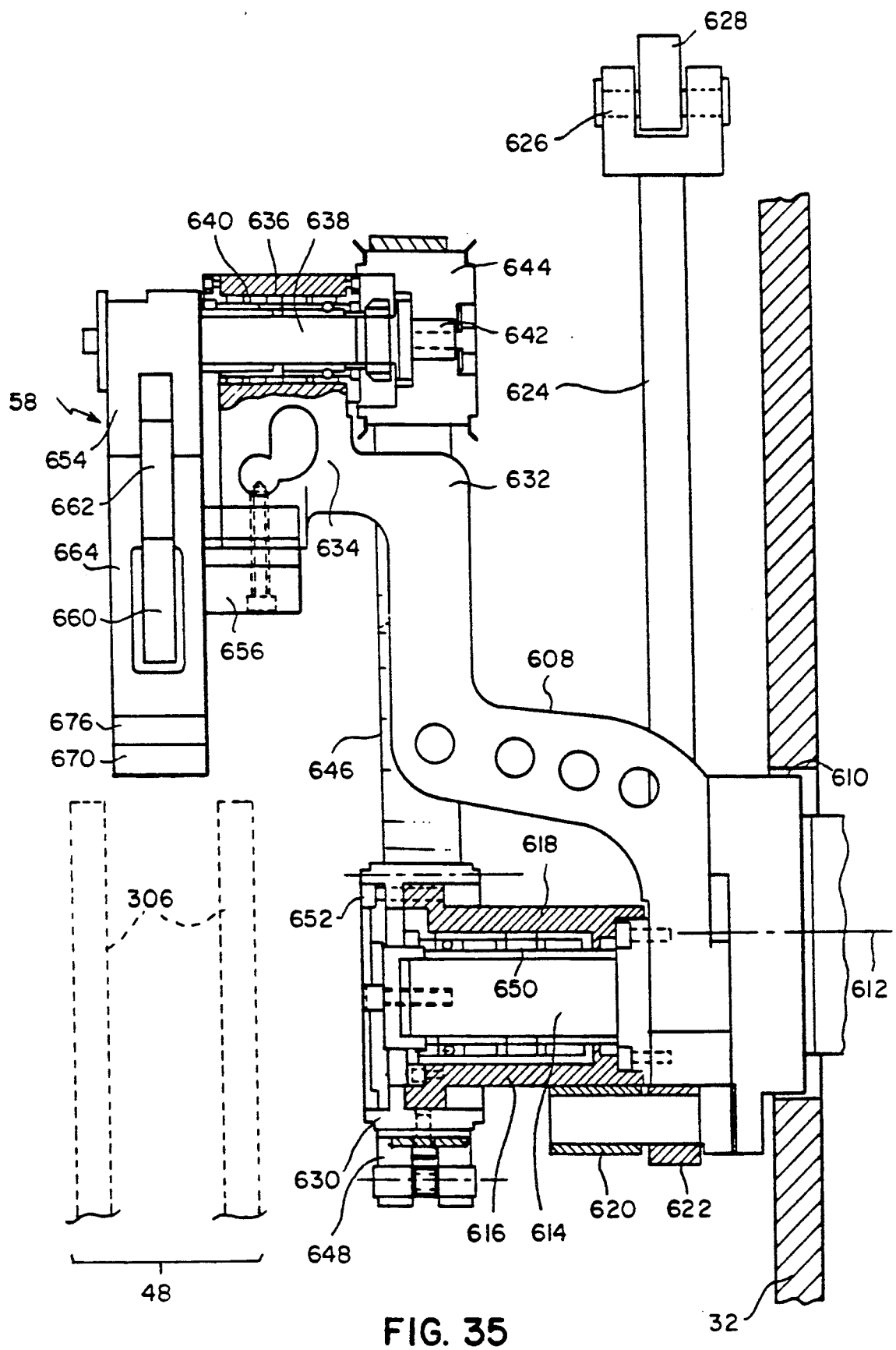
FIG. 35 shows a side elevation view, partially in section, of the mechanism of FIG. 32.

While the probes 546,548 of skewer assemblies 540,542 are properly positioning the prewound spool for closure of the very open shell, shell closing mechanism 58, illustrated in FIGS. 32 to 36, is rotating into position to close the shell. As shown in FIGS. 32 and 35, mechanism 58 comprises an outwardly extending arm 608 having a base flange 610 which is operatively connected to a conventional oscillator, not illustrated, mounted on the opposite side of face plate 32. The center of rotation of base flange 610 is indicated at 612. Offset from center 612, a stub axle 614 is mounted to base flange 610. A roller bearing 616 is supported by stub axle 614 and a sleeve 618 is rotatably mounted on bearing 616. At its end closer to base flange 610, sleeve 618 is provided with a radially extending arm 620, shown rotated into view in FIG. 35 for ease of illustration. Arm 620 is pivotably attached to one end 622 of a connecting rod 624 whose other end 626 is pivotably attached to a rotatable actuator arm 628 operatively connected to a conventional oscillator, not illustrated, mounted on the opposite side of face plate 32. Thus, movement of actuator arm 628 causes arm 620 to rotate sleeve 618, for a purpose to be discussed. At its other end, sleeve 618 is fixedly attached to a timing belt pulley 630 which is shown in FIG. 35 in a position corresponding to FIGS. 32 and 34. Arm 608 dog legs outwardly from base flange 610 above the assembly of shaft 614, sleeve 618 and timing pulley 630 and then radially above timing pulley 630. At the upper end 632 of its radial portion above timing pulley 630, arm 608 is provided with an outwardly extending boss 634 having a through bore 636 parallel to stub axle 614. Within bore 636, a shaft 638 is rotatably mounted on bearings 640. On the end 642 of shaft 638 above timing pulley 630 is fixedly mounted a timing pulley 644 and a timing belt 646 is fitted around pulleys 630 and 644. Thus, rotation of timing pulley 630 due to movement of actuator arm 628 causes shaft 638 to rotate. To facilitate adjustment of the tension in timing belt 646, the outer cylindrical flange of timing pulley 630 is split axially at diametrally opposed locations 630'; and timing belt 646 is cut and clamped at its ends 646' directly to the halves of the split flange. The halves of the flange each are provided with radially outwardly extending flanges 648 between which a tension adjustment bolt 650 extends. By adjusting the circumferential distance between the two flanges 648, the tension in timing belt 646 can be changed. Once the desired tension has been achieved, the halves of the split flange are secured to the body of the pulley by means of bolts 652 which extend through circumferentially elongated slots in the halves of the split flange. Timing of the rotation of the split flange relative to the rotation of radially extending arm 620 may adjusted by conventional means familiar to those skilled in the art, not illustrated.

Figure 36:
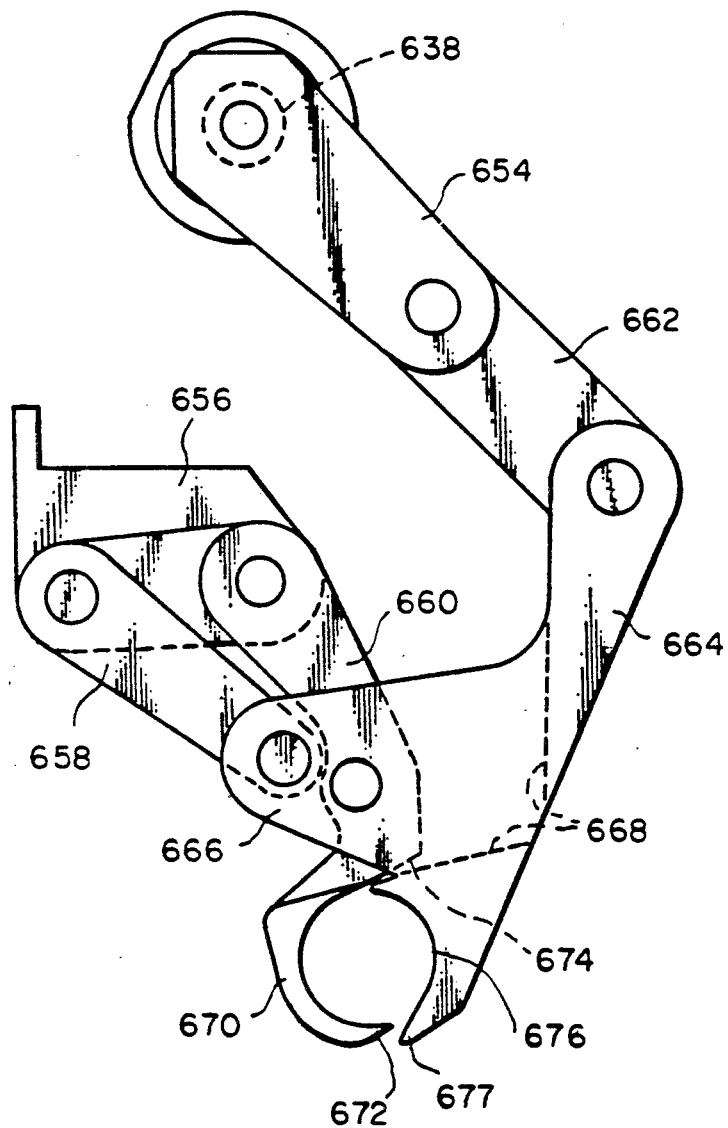
FIG. 36 shows an enlarged elevation view of the shell closing mechanism.

On the end of shaft 638 opposite to timing pulley 644 is fixedly mounted the actuator crank 654 of a linkage which is adapted to close very open shell 28 held within end cap applying mechanism 48, illustrated fragmentarily in FIGS. 32 to 34. The linkage is illustrated in larger scale in FIG. 36. A ground member 656 is attached to the underside of boss 634 and extends laterally beneath crank 654. Pivotably attached to the underside of ground member 656 is a first rocker link 658 and a second rocker link 660. The outer end of crank 654 is pivotably attached to one end of a link 662 whose other end is pivotably attached to a coupler link 664. A pair of attachment flanges 666, only one of which is visible in FIG. 36, extend on either side of a central slot 668 in coupler link 664, shown in phantom, slot 668 being sized to allow the passage of rocker links 658,660 which are pivotably attached to coupler link 654 between flanges 666. As seen in phantom in FIG. 36, rocker link 660 extends past its pivot to flanges 666 and includes at its outer end an essentially semicylindrical jaw portion 670 having an axial length somewhat less than the spacing between fixed claws 142,144 of shell removal mechanism 44; so that, jaw portion 670 can pass between fixed claws 142,144 during closure of very open shell 28. Jaw portion 670 is provided with an inner semicylindrical geometry which extends on both sides of slot 668 and is essentially congruent with that desired for the finished magazine over approximately 180 degrees measured from lip 20c of the very open shell and from an axially extending tip edge 672 for engaging lip 20c. Jaw portion 670 is also provided with a heel portion 674 which extends beyond its cylindrical portion and extends within slot 668 when the mechanism is closed as seen in FIG. 36. Heel portion 674 provides support for the very open shell during closure, thus preventing the formation of a bulge as the shell is closed. See also FIG. 33 where the closure mechanism is open. Beyond slot 668 and opposite jaw portion 670, coupler link 664 is provided with an essentially cylindrical jaw portion 676 with an inner cylindrical geometry which extends on both sides of slot 668 and is essentially congruent with the geometry desired for the finished magazine cover over somewhat less than 180 degrees, to allow for clearance for lips 20c, 20t.

The cycle of operation of shell closing mechanism 58 commences from the position shown in FIG. 32. Actuator arm 628 has been rotated counterclockwise to lift end 622 upwardly, thus rotating timing pulleys 630,644 and causing actuator crank 654 to pull jaw portions 670,676 apart. In the illustrated embodiment, pulley 644 must turn about ninety degrees to fully open jaws 670,676; but pulley 630 turns less since it is somewhat larger in diameter. In the position of FIG. 32, the center of the pivot connecting end 622 to arm 620 coincides with center of rotation 612 of arm 608, thus preventing inadvertent rotation of actuator crank 654 when arm 608 rotates about center 612. As end cap applying mechanism 48 moves into magazine assembly station 52, arm 608 is rotated in synchronism, so that it reaches the position shown in FIG. 33 just as mechanism 48 comes to a stop. To reach this position, separated jaw portions 670,676 pass between fixed claws 142,144 and over very open shell 28 where it is held by fixed claws 142,144. Actuator arm 628 is then rotated clockwise to force end 622 downwardly to the position of FIG. 34, thus rotating timing pulleys 630,634 and causing actuator crank 654 to force jaw portions 670,676 together. As the jaw portions move together, they engage very open shell 28 with essentially no relative rotation, thus minimizing any scratching of the surface of the completed magazine. The jaws close the shell to a good cylindrical shape and remain closed until end caps 24 have been installed. After the jaws have closed, the wound spool transfer mechanism 56 releases the hubs of the spool and the tail end of the film and withdraws to pick up the next spool, as previously described.

The mechanism for actuating end cap applying mechanism 48 is illustrated in FIG. 5. A stand off hub 678 is attached to the outer end of central stationary support tube 68 and supports a pair of bearings 680 surrounding the end of actuator shaft 80. A bevel gear 682 is attached to the end of shaft 80 and meshed with a further pair of angularly spaced bevel gears 684,686 rotatably supported by stand off hub 678 in bearings 688. Bevel gears 684,686 are fixedly attached to stub shafts 690,692 which carry at their outer ends plates 694,696 having diametral slots 698. Plates 694,696 are positioned relative to magazine assembly station 52 and magazine removal station 62, respectively, so that when end cap applying mechanism 48 is indexed into such stations, both slots 698 are entered by a cam follower roller 700, carried by a cam follower arm 702 affixed to the end of crank shaft 216 as shown in FIGS. 11, 12 and 14. Thus, when actuator shaft 80 is rotated by a conventional oscillator, not illustrated, plates 694,696 cause crank shaft 216 to rotate to close the anvils 306 and apply end caps 24 at magazine assembly station 52, and simultaneously to open the anvils 306 to release a completed magazine at magazine removal station 62.

After end cap applying mechanism 48 has been actuated to apply end caps 24 to the closed shell held by cylindrical jaw portions 670,676, actuator arm 628 is rotated counterclockwise to lift end 662 upwardly, thus rotating timing pulleys 630,644 clockwise and causing actuator crank 654 to pull jaw portions 670,676 apart. Due to the configuration of the linkage shown in FIG. 36, jaw portions 670,676 do not contact the closed shell as the jaws open. Simultaneously, skewer assemblies 540,542 are withdrawn in the manner previously described. Finally, arm 608 is rotated back to the position of FIG. 32 to permit assembly dial 46 to index the just assembled magazine to end cap staking station 60.

Though our invention has been described with regard to a single cylindrical shell, those skilled in the art will understand from the disclosure that the mechanisms of the assembly dial are capable, in cooperation with the end cap feeding mechanism, the skewer mechanisms, the wound spool transfer mechanism and the very open shell closing mechanism, of sequentially applying caps to a plurality of such shells, with various magazines being in different states of completion at any one time. The synchronization of the various indexers and oscillators disclosed for operating the dials and other mechanisms to achieve such operation is well within the skill of those in the mechanical arts.

While our invention has been shown and described with reference to particular embodiments thereof, those skilled in the art will understand that various modifications in form and detail of the apparatus and method may be made without departing from the scope and spirit of the invention.

Having thus described our invention in sufficient detail to enable those skilled in the art to make and use it, we claim as new and desire to secure Letters Patent for:

1. A method of applying end caps to a substantially cylindrical shell having substantially circular end edges, comprising the steps of:
   providing a pair of relatively movable jaws;
   providing on each of said jaws means for holding one of such end caps;
   placing one of such end caps in each of said means for holding;
   positioning such a shell between said jaws; and
   closing said jaws to apply such end caps to such end edges.

2. Apparatus for applying end caps to a substantially cylindrical shell having substantially circular end edges, comprising:
   a support;
   at least one pair of relatively movable jaws mounted on said support;
   means located on each of said jaws for holding one of such end caps;
   means located between said jaws for positioning one of such shells to receive such end caps;
   means positioned adjacent said support for placing an end cap in each of said means for holding; and
   means for closing said movable jaws to apply said end caps to such circular end edges.

3. Apparatus according to claim 2, wherein said movable jaws comprise:
   a pair of elongated frame members;
   means extending between said frame members for constraining said jaws to parallel movement toward and away from each other; and
   wherein said means for closing said jaws comprises:
   a frame attached to said support;
   a rotatable crank shaft mounted in said frame and connected to said frame members by oppositely movable connecting rods; and
   means for rotating said crank to close and open said jaws.

4. Apparatus according to claim 2, wherein said end caps are made from magnetic material and said means for holding one of said end caps comprises a pair of magnetic members, one mounted on each of said jaws.

5. Apparatus according to claim 2, wherein said means for placing an end cap comprises:
   a pair of cap delivery wheels rotatably mounted adjacent to said support, each of said wheels comprising peripheral pockets for carrying said caps;
   means for feeding caps into said pockets on each of said wheels;
   means for sequentially removing a pair of said caps from said wheels and transferring said caps to said means for holding.

6. Apparatus according to claim 5, wherein said means for sequentially removing comprises;
   a second frame mounted for rotation adjacent to said support;
   a pair of cap transfer arms pivotably mounted to said second frame, each cap transfer arm having an outer end selectively positionable upon rotation of said second frame into proximity either with one of said peripheral pockets or with one of said means for holding;
   means for selectively pivoting said cap transfer arms toward or away from said peripheral pockets, or toward or away from said means for holding;
   means at said outer end of each said cap transfer arm for securing a cap to said outer end; and
   means for rotating said frame to position said transfer arms alternately in proximity with said peripheral pockets and with said means for holding.

* * * * *